United States Patent
Grawrock et al.

(10) Patent No.: US 6,408,389 B2
(45) Date of Patent: *Jun. 18, 2002

(54) SYSTEM FOR SUPPORTING SECURED LOG-IN OF MULTIPLE USERS INTO A PLURALITY OF COMPUTERS USING COMBINED PRESENTATION OF MEMORIZED PASSWORD AND TRANSPORTABLE PASSPORT RECORD

(75) Inventors: David Grawrock, Aloha, OR (US); Shawn R. Lohstroh, Plano, TX (US)

(73) Assignee: Symantec Corporation, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/730,649

(22) Filed: Dec. 5, 2000

Related U.S. Application Data

(62) Division of application No. 09/564,672, filed on May 3, 2000, now Pat. No. 6,339,828, which is a division of application No. 08/864,297, filed on May 28, 1997, now Pat. No. 6,081,893.

(51) Int. Cl.[7] .............................. H04L 9/32; H04L 9/14; H04L 9/28

(52) U.S. Cl. ...................... 713/183; 713/165; 713/202; 380/281; 380/284

(58) Field of Search .................... 713/165, 176, 713/183, 185, 194; 380/281, 282, 284, 285

(56) References Cited

U.S. PATENT DOCUMENTS 5,710,817 A * 1/1998 Sjööquist ..................... 380/25
5,835,595 A * 11/1998 Fraser et al. ................. 380/25

* cited by examiner

*Primary Examiner*—Gilberto Barron, Jr.
*Assistant Examiner*—Justin T. Darrow
(74) *Attorney, Agent, or Firm*—Fliesler Dubb Meyer & Lovejoy LLP; Gideon Gimlan

(57) ABSTRACT

A system is disclosed for controlling intelligible access to secured files by means of a user-memorized password in combination with a user-associated passport record. The passport record takes on two forms, one when it is physically secured within the workstation and a different second form when the passport record is in-transit. Log-in privileges are granted after a presented passport record passes a number of tests including digital signature authentication, and the ability to extract two different encrypted keys from the passport record. The in-transit record does not carry one of those two keys.

13 Claims, 7 Drawing Sheets

SYSTEM FOR SUPPORTING SECURED LOG-IN OF MULTIPLE USERS INTO A PLURALITY OF COMPUTERS USING COMBINED PRESENTATION OF MEMORIZED PASSWORD AND TRANSPORTABLE PASSPORT RECORD

This application is a divisional of and continues from U.S. Ser. No. 09/564,672, filed May 3, 2000 now U.S. Pat. No. 6,339,828, which is a divisional of and continues from Ser. No. 08/864,297, filed May 28, 1997 now U.S. Pat. No. 6,081,893. The disclosures of said applications are Feb. 5, 2002 incorporated herein by reference.

BACKGROUND

1. Field of the Invention

The invention relates generally to the field of securing stored digital data from access by unauthorized users.

The invention relates more specifically to the problem of providing password-based, secured file access to users who work on any one of a plurality of computers.

The invention relates even more particularly to the problem of providing user log-in records (passport records) and allowing the same to be securely used across a plurality of computer workstations for user authentication and for other user-specific needs.

2. Cross Reference to U.S. Patents

The following U.S. patents are assigned to the assignee of the present application, and their disclosures are incorporated herein by reference:

(A) U.S. Pat. No. 5,768,373, issued Jun. 16, 1998 by S. Lohstroh et al and entitled, A METHOD FOR PROVIDING A SECURE NON-REUSABLE ONE-TIME PASSWORD;

(B) U.S. Pat. No. 5,953,419, issued Sep. 14, 1999 by S. Lohstroh et al and entitled, CRYPTOGRAPHIC FILE LABELING SYSTEM FOR SUPPORTING SECURED ACCESS BY MULTIPLE USERS; and (C) U.S. Pat. No. 5,699,428, issued Dec. 16, 1997 by W. McDonnal et al and entitled, SYSTEM FOR AUTOMATIC DECRYPTION OF FILE DATA ON A PER-USE BASIS AND AUTOMATIC RE-ENCRYPTION WITHIN CONTEXT OF MULTITHREADED OPERATING SYSTEM UNDER WHICH APPLICATIONS RUN IN REAL TIME.

3. Description of the Related Art

As knowledge of computers proliferates throughout society; and as use of computers and of digital data also spreads, the threat grows that unauthorized persons will gain useful (intelligent) access to confidential, digitized information.

As such, it is advisable to take security measures to limit the number of persons who can intelligibly access various stored or transmitted forms of digital data. It is sometimes further advisable to limit the physical locations from which such intelligent access can take place.

A wide variety of materials may be stored or transmitted in the form of digitized signals. By way of example, proprietary digital data may represent financial and engineering documents of a start-up engineering company. The latter documents may be nonvolatily stored as encrypted digital data in the company's central database computer or they may be similarly stored repeatedly across a plurality of networked workstations or even among non-networked portable computers or even further among portable media devices such as floppy diskettes that are carried about by company workers from place to place.

The company may wish to have certain of its proprietary documents kept more confidential than others. More specifically, the company may want to restrict intelligible access to some stored documents such that only very specific groups of people can do so and perhaps only when those people are accessing the information from very specific locations.

At the same time, the company may wish to permit other stored documents to be intelligibly accessible to any company worker from any location while blocking the general public from having similar access.

The company may further desire to have a wide variety of other security options picked out from a spectrum that has at one end, only one specifically authorized person accessing a certain piece of information through only one specific machine, and which spectrum has at an opposed end, all authorized persons being able to intelligibly -access all pieces of information through any machine located anywhere.

As a more concrete example, the company may possess critical financial records and may wish to limit intelligible access to these records to certain, high level officers of the company provided further that these people log-in through any of a limited number of specific machines located in certain specially-secured offices of the company's.

At the same time, the company may have an ongoing engineering program that a select group of engineers are to be allowed access to by means of logging-in from any workstation they happen to be on. For example, a remotely located, company engineer may need to quickly access, by way of communications carried over a local area or a wide area or another communications network (LAN or WAN or Internet), a particular, confidential engineering file that is needed for a rush engineering job.

The security of the so-requested information needs to be safeguarded while it is in-transit. This can be done by transmitting an encrypted copy of the requested file over the communications network. The transmitted copy has to be decrypted at the receiving end to make its information intelligible.

However, before intelligible access is granted at the receiving end, the local computer on which the alleged requestor is working, should verity that the requestor is indeed whom he or she claims to be rather than a spoofer.

The local computer will typically display a demand for a user identification (e.g., the user's publicly-known name such as 'John E. Doe' or his initials 'JED') and for a user-memorized password (which password should be known only to the user).

If the requester fails to authenticate his or her identity with a valid identification and matching password, access should be denied.

Often times, the memorized password and user ID are not enough by themselves to provide a desired level of security. After all, the user's identification (his or her name) is known to too many people and thus does not act as a significant safeguard.

The user's password can be compromised through trickery or inadvertence. For example, a first user may trust a 'friend' and reveal the password to the friend over the telephone because the friend legitimately needs a particular file. The friend may write the password and the first user's name on a slip of paper so as not to forget. The same friend may later neglectfully drop the paper in a trash bin or other unsecured area where it is acquired by a third person. That third person can then try to penetrate the secured system from any of a large number of portals using the so-compromised password and first user's identification.

In some systems, the physical location of the log-in portal is used as an additional safeguard to reduce the risk of compromise from scenarios such as the one above. Each authorized user is asked to remember a different password for each of plural computer terminals or workstations that the user will work from. If an unauthorized third party gets a hold of one of the many passwords, that third party still has to determine through trial and error which machine will accept the password and matching user's name. This may take significant time and expose the third party to risk of being detected as he or she tries to log-in into the various different machines.

As additional security, some of the differently-located machines may not be permitted to receive or decipher all of the company's encrypted files. This helps to decrease the amount of possibly compromised data in the event that the third party successfully determines which machine will accept a compromised password and matching user's name.

Such dependence on different passwords for different machines is an annoyance however.

Few people want to remember a large number of unique passwords each for a different machine, unless of course, there is a very powerful reason for doing so. Authorized users generally want to be able to roam freely from one workstation to another, and to be able to enjoy quick and easy access to all the information they have authorization for with a single password.

However there is still the danger that the single password of a particular user may leak out inadvertently or through trickery.

If each user wants to rely on just a single, personal password, it is prudent to have one or more additional layers of security.

One such further layer of security is that of requiring authorized users to present a computer-readable identification badge or card (such as a smart card or a magnetic strip card) to the computer at the time of log-in. The computer-readable identification badge should carry a password-word related, long digital key, where the latter key is too long to memorize and ties somehow to the password.

Physical possession of the computer-readable identification badge can be deemed as additional proof that the user is whom he or she claims to be rather than an imposter.

There are problems with the badge approach however. A first problem is the inconvenience of having to physically carry the computer-readable identification badge about. A second problem is the possibility of losing it. If the badge is lost, the user is not only blocked from immediately logging-in but is also blocked from immediately changing his or her password when he or she realizes the badge is lost. This creates a window of opportunity for an unauthorized third party to acquire the old password and the lost badge, and break into the system.

A user should be able to change his or her password at any authorized workstation at any time as desired. Such user-initiated, arbitrary change of the password at any time and any authorized place is a generally desirable thing because it reduces the likelihood of security breaches. Such arbitrary change of password may even be deemed necessary in instances where the user suspects that his/her prior password and identification badge have been compromised.

It would be advantageous to have a secure system that is simple and convenient to use, and in addition is flexible.

The above-mentioned, flexible characteristic implies that each authorized user will be allowed to utilize one or more user-specified passwords to access data either on all or a specified subset of plural machines as that user or a system administrator see fit for the given circumstances. The flexibility characteristic further implies that each authorized user will be able to arbitrarily change his or her password at any time and authorized place either for a specified single machine or for all machines or for a unique subset of machines as seen fit for the specific circumstances.

The above-mentioned convenience characteristic implies that password-associated authorizing codes (such as the long digital key mentioned above) can be moved around in a confidential and effortless manner despite their use over a plurality of machines, without requiring a physical identification badge.

SUMMARY OF THE INVENTION

An improved, machine-implemented security method and apparatus are disclosed herein for providing flexible and convenient secured access to encryption-covered information on a per-user basis across a plurality of machines.

In accordance with the invention, when a user creates a password for the first time or changes his or her password, an associated key (K) is generated in the computer workstation that first receives the new/changed password. A user log-in record (also referred to herein as a 'passport record') is also generated in that workstation for securely storing the password-associated key (K) and other authorizing codes.

The password-associated key is typically a long stream of say 128 or more randomly-generated bits that cannot be easily memorized, and as such must be recorded into and held within some form of storage media. The user log-in record (passport record) is the data structure that is recorded into the storage media and is used for carrying the key along with other information. The log-in record can. be transferred from machine to machine either by signal transmission (e.g. by wire) or by physical conveyance of a storage device (e.g. a smart card) as desired.

Further in accordance with the invention, log-in records have at least two different formats. (1) one which is used when the storage media of t he log-in record is 'physically secured'; and (2) another which is used when the log-in record is 'in-transit'.

Examples of the in-transit mode include instances when the log-in record is held in an easily transported storage media such as in a magnetic strip card or in a floppy diskette and instances when the log-in record is being transmitted through an unsecured transmission means (where the latter could be cable or radio broadcast).

When a user next tries to log into the computer system through any portal, after the initial password and log-in record have been created, the user must not only generally present the same password, but the user's log-in record must also be presented to or must be already present in the local computer (workstation) to further validate that the user is whom he or she claims to be. (An exception to this rule may occur if the user forgets his/her password and the user instead uses a backdoor entry mechanism referred to as OTP {One Time Password} which mechanism is detailed in the above-cited U.S. Pat. No. 5,768,373.

In essence, the user's log-in record acts as a sort of passport document that is generally required to be presented in untampered-with form at the local workstation in addition to the password. In one embodiment, the combination of password and log-in record is demanded even before the operating system is allowed to fully boot-up.

For security-reasons, a log-in record in accordance with the invention stores an encrypted version (K*) of the password-associated, key (K). Both the correct password and an untampered version of the user's log-in record bearing the correct encrypted key (K*) are generally needed for successful logging-in the next time the user wants to log into the system.

When a user's log-in record is in transit, it takes on a split-key format wherein two independent keys are needed to permit log-in. One of those keys however (e.g., the PriWK1 key described below) is not included in the in-transit log-in record and must be separately provided by, for example, a local administrator at the time of import of the in-transit log-in record into the workstation through which log-in by the user is desired.

The other key (e.g., the KS0 key described below) that is needed for successful log-in is included in the in-transit log-in record, but in encrypted form (KS0*). The data of the in-transit log-in record is protected by a digital signature, thereby making undetected tampering with the data of the in-transit record unlikely.

One embodiment of a user's log-in record in accordance with the invention is covered by a digital signature signed by the user's private key. The record includes the following fields: (a) an encrypted version (KS(0/1)*) of either: (a.1) a password-associated, outside key (KS0) that was generated outside the local workstation or (a.2) a password-associated, internal key (KS1), where the internal key was independently generated by the local workstation and is therefore usually different from the outside key (KS0); (b) a flag field that specifies whether (a.1) or (a.2) is true; (c) an encrypted version (PriUK*) of a private user key where the encrypted version is formed using KS(0/1) as an encrypting key; (d) a private key-holding field that is: (d.1) blank when the record is in-transit, or (d.2) holds an encrypted version (PriWK1*) of a private workstation key when the record is physically-secured within a corresponding workstation, where the physically secured encrypted version is formed using a private key generated within and belonging to the corresponding local workstation; (e) a user's local key-holding field that is: (e.1) blank when the record is in-transit, or (e.2) holds an encrypted version (KS1*) of a user-specific local key when the record is physically-secured within a workstation, where the physically secured encrypted version is formed using a user-specific key generated within and belonging to the combination of the local workstation and the specific user; and (f) a pre-OS validating field that holds an encrypted version (DOS.txt*) of validating string covered by KS(0/1). When the record is in-transit between workstations, KS(0/1) does not equal KS1, the private key-holding field is blank, and the user's local key-holding field is blank.

During log-in, the user is asked to supply his or her memorized password. Before OS-bootup completes, the supplied password is tested for its ability to extract from the user's log-in record, a plaintext version of the validating string (DOS.txt). After OS-bootup completes, the supplied password is tested again for its ability to extract from the user's log-in record, a plaintext version of the local workstation's private key (PriWK1) and a plaintext version of the user's private key (PriUK). Failure at any of these test points results in denial of log-in.

The digital signature on the user's log-in record provides pre-log-in authentication, meaning that presentation of an untampered-with log-in record can be verified by digital signature technique. The user's log-in record therefor acts as a sort of tamper-proof passport document that must be presented in untampered with form in addition to the password.

A central server is not needed for dispensing or validating log-in records, although one could be used if desired.

Other features and aspects of the invention will become apparent from the below detailed description.

BRIEF DESCRIPTION OF THE DRAWINGS

The below detailed description makes reference to the accompanying drawings, in which:

FIG. 2 is a flow chart showing how either an internally-originated or externally-acquired user's log-in record is used for logging in;

DETAILED DESCRIPTION

Introduction

Figure 1A:
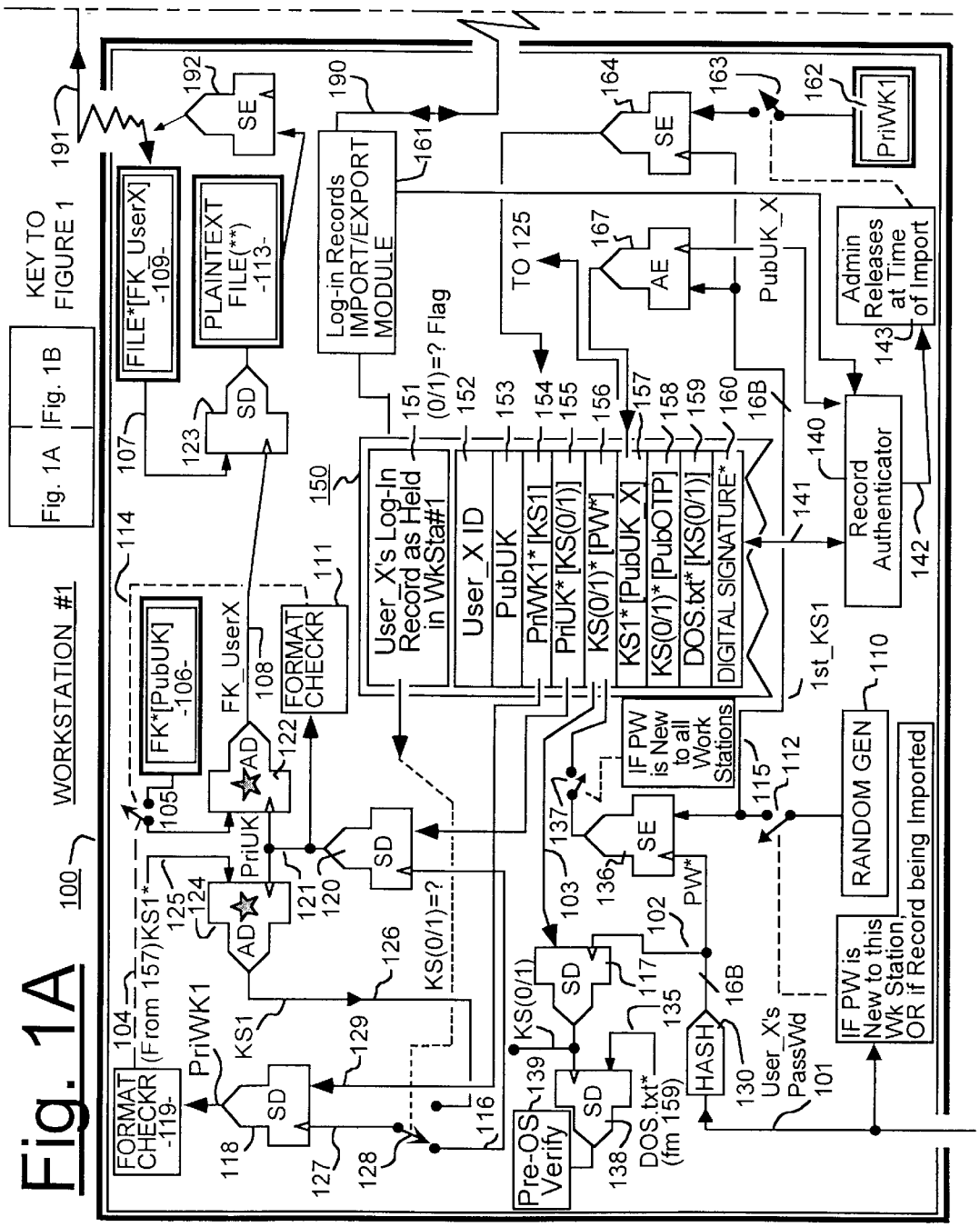
FIG. 1 is a block diagram showing a log-in record system in accordance with the invention.
Figure 1B:
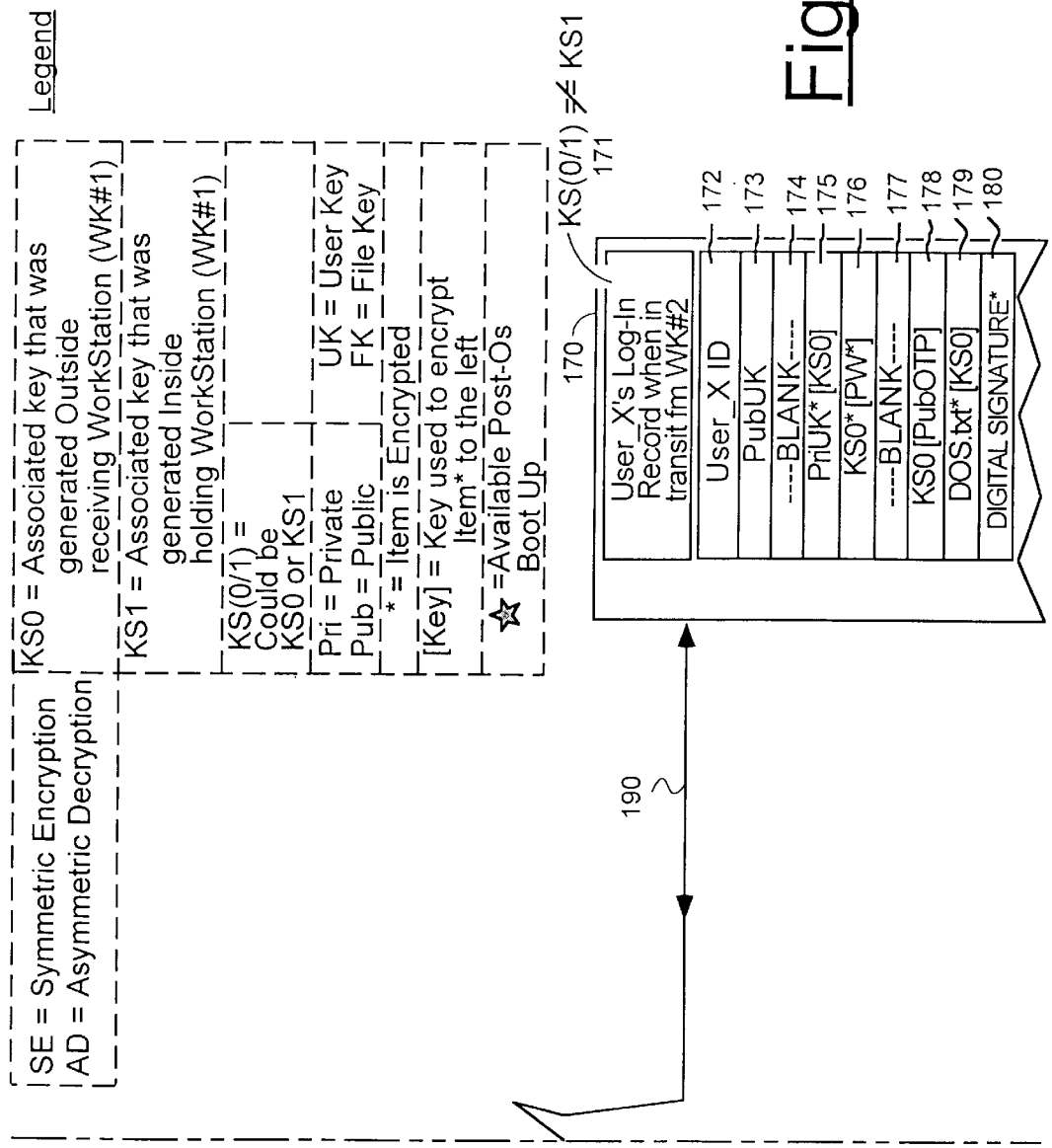

FIG. 1 uses a set of abbreviations for indicating various encryption/decryption processes and management of encryption/decryption keys. Those who are well skilled in the art of public/private key cryptography may choose to quickly glance at the legend in FIG. 1 and then skip past the below discussion of basics and terms.

Basics

The system shown in FIG. 1 relies in part on a set of public-key/private-key cryptographic subsystems. The RSA public/private-key system (invented by Ron Rivest, Adi Shamir, and Leonard Adleman) is an example of such asymmetric key systems. Elliptic curve algorithms are another example.

The prefix 'Pri' is used in FIG. 1 to indicate a private key while the prefix 'Pub' is used to indicate a public key. When a public/private-key paradigm is used, a pair of interrelated, but different keys is generated. Such interrelated keys are often referred to as a user's public key and the user's private key.

As the name implies, a user (or any other key owning entity) is expected to keep his or her 'private user key' (PriUK) in essentially complete confidence. In contrast, the user's public key (PubUK) may be disseminated freely to the general or a limited public.

Data that has been appropriately encrypted with the respective private key (PriUK) of a specific user can be decrypted by anyone possessing the corresponding public key. Successful decryption not only provides a plaintext version of the original data but also indicates that the source was someone in possession of the private key (usually only the user or perhaps one of a few entities that are trusted by the one user) Asymmetric algorithms such as the RSA public/private-key system usually output a success flag that indicates whether decryption has been successful. This allows a recipient to identify who sent the data even if the extracted plaintext data consists of nonsense information.

Data that has been appropriately encrypted with the public key (PubUK) can be decrypted in general only by the one user (or perhaps also by those few entities, if any, that have been entrusted with the PriUK of the one user). This means that possessors of the user's public key can send encrypted data to the desired user (and/or his/her entrustees) over an unsecured channel with little risk of exposing the underlying information. Successful decryption at the receiving site not only provides a plaintext version of the transmitted information but also indicates that the person (or other entity) who successfully decrypted it was the intended recipient (namely, the person in possession of the private key).

The asymmetric public/private-key system is not the only method that may be used for securing data. There are also, so-called symmetric key systems which use a same 'symmetric' key for both encrypting and decrypting their payload data. Examples of symmetric encryption/decryption systems include, but are not limited to: (1) XORring with a randomly-generated bit stream, (2) X_NORring with a randomly-generated bit stream, (3) DES (the US Government-sponsored Data Encryption Standard), (4) Triple-DES (5) RSA RC4™, and (6) Blowfish, the latter being attributed to Bruce Schneier. The term 'randomly-generated bit stream' is to be understood as also contemplating bit sequences that are generated by pseudo-random techniques.

There are tradeoffs between choosing to use either symmetric or asymmetric cryptographic methods.

Symmetric key systems tend to work faster and are thus preferred when voluminous amounts of data have to be encrypted or decrypted. On the other hand, distribution of a same symmetric key (KS) to all possible senders and recipients creates a greater risk of compromise. As the list of possible senders and recipients grows, so too grows the probability that a copy of the key will slip into possession of unauthorized persons.

Asymmetric key systems (e.g., RSA public/private-key system) are less vulnerable to such leakage because the private key is not distributed to all possible senders and recipients. There is much less risk of security compromise, particularly as the list of data senders and recipients grows. However, asymmetric systems tend to work slower than symmetric systems. As a result, the asymmetric systems become less and less preferred as the amount of data that has to be encrypted or decrypted grows.

Abbreviations and Terms

Some of the abbreviations used herein have already been explained in the above Basics section. Examples are those for the private and public user keys, PriUK and PubUK. These abbreviations are also defined in the Legend portion of FIG. 1.

For sake of convenience, information that is in encrypted form is usually denoted herein by an identifying name that is postfixed by a single or an odd number of asterisks (* or *) Plaintext information that is not in encrypted form is usually denoted herein by an identifying name that is postfixed by either none or an even number of asterisks ().

An example is the data identified as, FILE*, which data is understood to be encrypted and is shown to be nonvolatily stored at location 109 in FIG. 1. (See top right of box 100.) Although the process for generating the FILE* data is not fully shown, it is understood that this FILE* data 109 was created by encrypting the plaintext information of original data, named FILE (or FILE**), with a specific key.

The key that was used for carrying out a predecessor encryption process is often identified herein by square-bracketed text following the identification of the resultant, encrypted data signal. Thus, the encrypted FILE* data stored at location 109 is denoted as FILE* [FK_UserX] and this indicates that the stored information is encrypted and further that the data-producing encryption process was carried out using a key named 'FK_UserX'. In the particular example of FILE* at 109, the encryption process (e.g., 192) was a symmetric one such as Blowfish, and FK_UserX represents a symmetric file-key belonging to a user named X. This is seen from the fact that a symmetric decrypting unit (SD_unit) 123 is used to produce a corresponding plaintext version FILE** for storage at location 113.

In general, the prefix 'KS' is used herein to indicate a symmetric key. FK_UserX is an exception to this general rule. PW* is another exception. It is understood from FIG. 1 that PW* defines a symmetric key because the PW* signal feeds into a key-input of a symmetric encrypting unit (SE_unit) 136 and also into a key-input of a symmetric decrypting unit (SD_unit) 117.

By definition, symmetric keys (KS) are generally presented to the key-receiving inputs of either a symmetric encrypting unit 'SE' or a symmetric decrypting unit 'SD'. Hollow (or white-filled) arrowheads are used in FIG. 1 to indicate the key-receiving inputs of the respective encrypting or decrypting units. An example is seen where the FK_UserX signal 108 enters SD_unit 123. Encrypting and decrypting units are understood to be so-functioning devices that can be implemented in hardware, software, or a combination of hardware and software.

When an asymmetric public/private-key subsystem is used, the corresponding asymmetric encrypting unit is designated in FIG. 1 as 'AE' and the corresponding asymmetric decrypting unit is designated as 'AD'. An example is seen at 121 where the private user key signal PriUK enters AD_unit 122.

The encrypting and decrypting operations of asymmetric public/private-key systems tend to be more complex than those of symmetric systems. Although asymmetric public/private-key systems can be implemented entirely by hardware, cost considerations usually drive designers to implement most if not all of their calculation functions by means of software (e.g., by means of program algorithms carried out by a correspondingly programmed computer). In the embodiment of FIG. 1, the functions of AD_unit 122 are carried out primarily by software routines that are loaded into the illustrated workstation 100 by a preloaded operating system (OS). A star symbol (☆) indicates that the functions of AD_unit 122 become available only after the OS has fully booted up. It is understood however that in general, the implementation of AD_unit 122 is not limited to such OS-dependant software loading.

Darkened (or black-filled) input arrowheads are used in FIG. 1, on the symbols for the encrypting and decrypting units to indicate the port that receives the payload data (as distinguished from the key input that receives the counterpart encrypting or decrypting key). An example is seen at 107 where the symmetrically-encrypted data, FILE* enters SD_unit 123.

Because it is encrypted, the FILE* data 109 of FIG. 1 may be recorded as such in a computer-readable, nonvolatile media (e.g., a hard disk or a portable floppy diskette or even a credit-card sized smart card) and/or that the FILE* data may be transmitted over a publicly-accessible transmission channel with little fear that the information contained in that file will be. intelligibly accessible to unauthorized persons. This is so even if such unauthorized persons gain possession of media containing a recorded copy of the FILE* data or even if such persons intercept a transmission of the FILE* data. (Bidirectional transmission path 191 indicates such open transmission of the FILE* data in 109.)

When intelligible use of the information in the FILE* data stored at 109 is desired, signals 107 that represent the encrypted information need to be delivered to a data input (dark arrowhead) of an appropriate decrypting unit (in this example, SD_unit 123). A digitally coded signal 108 representing the appropriately matching, decrypting key (symmetric file key, FK_UserX in this example) needs to be correspondingly delivered to the key input (hollow arrowhead) of the same decrypting unit (123).

If the key matches properly, and the corresponding decryption algorithm (e.g., Blowfish) is carried out by the D_unit (123), then the D_unit will produce the decrypted output, FILE () 113 that contains the plaintext information. The double asterisks, postfix notation () indicates here that the resultant data had been produced by first encrypting original data and then decrypting the encrypted data. The post-decryption FILE() 113 is usable as plaintext in the same way as the original FILE (not shown) could have been. Given this, it is preferable to keep the plaintext FILE() 113 physically secured within the confines of the workstation 100 in which it was produced and not to allow a plaintext copy to escape the physically-secured confines. If a user wishes to export the information of post-decryption FILE() 113 to another location, the user should first encrypt it, for example by way of symmetric encrypting unit 192, to form a newly-covered FILE* (not shown) before sending FILE* out of the physically secured confines of workstation 100 by way of path 191. (If FILE contains extremely sensitive information, then use of asymmetric encryption or alternatively not sending it out over unsecured channels should be considered.)

The act of decrypting data such as FILE* 109 is occasionally referred to herein as 'uncovering' or 'unlocking' such encrypted data. If plaintext data is encrypted by a particular key, the encrypted version (e.g., 109) may be said to be 'covered' by that key.

The term 'covered' is also used herein in a slightly different manner when used in conjunction with digital signatures. When data is 'covered' by a digital signature it means that the data is rendered essentially tamper-proof (it cannot be easily modified without creating a mismatch with the covering digital signature). Such digital signing may be effected, as is well known, by encrypting the to-be-covered data or a hash thereof with a user's private key. The encrypted result defines the digital signature. The user's public key is later used to decrypt the DIGITAL SIGNATURE* signal stored in the signature field. The resultant plaintext is then compared against the covered data or a hash thereof. If they match, the covered data is said to be 'authenticated' by the accompanying digital signature.

Workstation 100 Viewed from Multiple Perspectives

Workstation 100 (FIG. 1) will be described herein from a number of different perspectives: (a) as a record originating node; (b) as a record importing node; and (c) as a record exporting node; where in each instance the subject record is a log-in record (or 'passport' record) associated with a particular user.

It is worthy to note here that, when the log-in records of particular users are being moved amongst various workstations (from a record exporting node to one or more record importing nodes), there is no need for a central server. Any workstation may export a log-in record either by wire or by other means to any other specified workstation. Any workstation may alternatively broadcast the exported log-in record via a network to all other workstations on the network. There is no specific media required for transferring log-in records between machines. Log-in records can even be transported between workstations by physical conveyance means such as hand-carried floppy diskettes or credit-card sized smart-cards that have sufficient data storage space.

Additionally there is no need for serving out log-in permissions from a primary repository or registry to remotely located workstations over a network.

This is to be contrasted with what is done for example in server-dependent systems such as Microsoft Windows NT 4.0™ (the latter being available for Microsoft Corp. of Redmond Washington).

In the Windows NT 4.0™ system, a domain securing registry of authorized users has be held in one or more Domain-Controlling servers (the PDC plus optional BDC's) and a secured transaction has to successfully completed over a network before a user is permitted to log-in. The 'primary' PDC server can crash, which is why typically there is at least one 'backup' BDC to prevent log-in lock-out when the PDC crashes. The network can go down, in which case, if there is no backup network connecting to a PDC or BDC, the user will be locked-out from logging in even if the PDC or BDC is up and running.

According to the present invention however, each workstation can be made individually responsible for maintaining security with respect to allowing a user to log-in; and with respect to importing user log-in records from external, and perhaps suspect, sources; and with respect to exporting user log-in records. The combination of an operational central server and a working network is not required for maintaining log-in security. A user is not necessarily blocked from logging-in and accessing his or her data just because a remote server or even the network went down.

On the other hand, the present invention permits flexible configuration as dictated by circumstances. If it is desirable to enforce a domain-wide policy wherein only one or a select few workstations (say the system administrator's workstations) are to function as exporting sources for all users' log-in records, the system disclosed herein can support such a policy. In such a case, the record exporting function of individual workstations that are not to be permitted to dispense log-in records would be disabled, and only the selected few workstations would have the record exporting function enabled. This feature will be better understood after the record use, record originating and record exporting procedures are described further below.

Workstation 100 Viewed as the User's Original Log-in Port

In order to keep matters simple, item 100 (workstation number 1) of FIG. 1 will be viewed initially as being the only computer or workstation that a particular one or more authorized users has used before.

In this first instance, item 100 will be further viewed as the one and only computer through which a same one of those users is trying to legitimately access his or her file data. It will be helpful to remember for this first instance that a below-mentioned signal named KS(0/1) is set equal to a locally-produced key, KS1 because the discussed records were 'originated' in the subject workstation 100.

In this initial perspective, each of the one or more authorized users is understood to have a respective user's log-in record 150 already created for him or her. Each such user's log-in record is preferably physically secured within the workstation 100.

The term, 'physically secured' as used herein indicates a physical barrier both to easy removal from the workstation of the storage media that contains the users' log-in records and to easy export of the log-in record's data (150) by means such as wire transfer or floppy diskette.

One nonlimiting example of such physical securing is the use of a hard disk drive that is physically fastened to an interior portion of a security-grade casing or housing of the workstation 100, the fastening being realized with a large number of tightly fastened screws or nuts. The screws or nuts may have special configurations that require use of a specially-keyed tool to loosen them instead of say, a conventional flat head screw driver or a hex nut wrench. The cables that interconnect the disk drive to other parts of the computer (workstation 100) should also be securely contained within the computer's casing. Such physical barriers make it difficult for a momentary interloper to easily take possession of the data-storing media and to indiscernibly remove it to another location for leisurely analysis of its data. Such physical barriers further make it difficult for the momentary interloper to easily tap into the drive's signals.

By contrast, a floppy diskette that is easily removed from a floppy drive (not shown) of machine 100 or easily swiped while freely laying on a desk is an example of a holding media that is not 'physically secured'.

Physical securing measures vary and can further include, by way of more nonlimiting examples, the bolting of a key-locked computer case made of thick steel to a large and heavy desk, or even to the concrete floor of a building so the computer 100 itself cannot be easily removed from the premises. In such a situation the media that holds the users' log-in records 150 is even more physically secured than one that is merely secured in a more easily removed computer. The extent of physical securing measures taken will usually depend on the economic value of the data being secured, and this varies from case to case.

The term 'algorithmically secured' as used herein refers to nonphysical security measures such as encryption.

In accordance with the invention, internally-held log-in records such as 150 (detailed shortly) are algorithmically secured to a certain extent. Nonetheless, workstation 100 should not be permitted to export such internally-held user records 150 in the same form as they are held within a physically secured portion of the machine. Instead, a record importing/exporting module 161 is used to create a partially-blanked copy 170 of each record that is to be exported, and only that more algorithmically secured copy 170 is exported. Note blanked fields 174 and 177 in FIG. 1.

Continuing with more details for the initial perspective, item 150 represents the log-in record of a pre-authorized user named X. Item 150 is accordingly denoted in FIG. 1 as User_X's Log-in Record. It is to be understood that if there is another user named Y who is pre-authorized to use workstation 100, that user Y will have a respective User_Y's Log-in Record that is similarly, physically secured within workstation 100. And then if there is yet another authorized user named Z, there will be a User_Z's record, and so forth.

The file data that the aforementioned one or more authorized users (X, Y, Z, etc.) is each trying to intelligibly access is usually algorithmically secured with user-specific keys. For example the information of FILE* 109 is stored in encrypted form under coverage of user X's file key, FK_UserX. The storage media that holds FILE* [FK_UserX] 109 ma y be physically secured wit h in workstation 100 as is shown in FIG. 1 but does not need to be. FILE* [FK_UserX] could be instead stored in an external file server or on easily removable media such as a floppy diskette. Path 191 implies that FILE* 109 may be exported out of the confines of workstation 100 because * FILE* 109 is algorithmically secured. Of course, it may be desirable to use a combination of both physical securing measures and algorithmic securing measures as the sensitivity of the secured information grows.

When each user tries to gain intelligible access to encrypted information such as that of FILE* 109, each such user is implicitly asking the workstation 100 to supply a plaintext version 108 of the covering key (e.g., FK_UserX) to a corresponding decrypting unit (e.g., 123).

Before workstation 100 grants this request however, the putative user is asked to log-in into the computer system. Successful log-in calls for the submission of a memorized password from the user, and perhaps submission of other information as may be asked for by the log-in procedure of the workstation's operating system (OS) software.

It is to be understood, even though not shown in FIG. 1, that the workstation 100 includes conventional inter-operating hardware and software for implementing an intelligent computer port. Such conventional elements may comprise a CPU or other programmable data processing means; system RAM; a hard disk, a floppy disk drive, a CD-ROM drive, a DVD-drive, network interfacing means, a keyboard, a mouse, a video display, the already mentioned operating system, and so forth.

The operating system (OS) normally asks each logging-in user for identification information including a user ID (e.g., the user's name or initials) and a user password. The user password is preferably a unique character string that the user has committed to memory only in his or her mind. If the user forgets the password, a one-time password bypass procedure (OTP) may be used such as disclosed in the above referenced Ser. No. 08/643,742 which bears the title, A METHOD FOR PROVIDING A SECURE NON-REUSABLE ONE-TIME PASSWORD. Field 158 of the record 150 supports the OTP procedure.

Input 101 of FIG. 1 represents the submission by the user named X of his or her password (PW) into system 100. It is to be understood that at this stage the user has already supplied his or her publically-known, User ID (otherwise known as user name), and the computer 100 has already scanned through its physically secured holdings of users' log-in records (including those of users Y, Z, etc.), and the computer has further located the one record shown at 150. This record contains the matching plaintext, User ID in field 152 (User_X ID).

During the course of bringing this matching record (User-X's Log-in Record 150) into consideration, the operating system may have optionally also checked the authenticity of the retrieved Log-in Record 150 by using the DIGITAL SIGNATURE* stored in field 160 to verify various signature-covered fields within User_X's record (e.g., fields 151 through 159). The computer may have further checked the authenticity of the retrieved log-in record 150 by using field 159 in combination with a pre-OS verification process described below, that process being represented in part by item 139 of FIG. 1.

The plaintext version (PW) of the user-submitted password 101 is applied to a hash function module 130 and thereafter preferably scorched from line 101 (erased without possibility of recovery from line 101). In response, the hash function module 130 outputs a cryptographic hash PW* of the input signal. In one embodiment, hashing unit 130 uses the MD5™ hashing function which is commercially known. The output PW* signal of this embodiment is 16 bytes (128 bits) long.

The PW* hashed signal is supplied to a key input 102 of symmetric decrypting unit 117 (SD_unit 117). In one embodiment, SD_unit 117 performs the Blowfish algorithm. Data input 103 of the SD_unit 117 receives a KS(O/1)*[PW*] signal from field 156 of the user's log-in record 150 as shown. If the password is correct, the SD_unit 117 responsively outputs the plaintext signal KS(0/1) on output line 116.

In this initial case under discussion (wherein key KS(0/1) is equal to key KS1 because the record originated in workstation 100), a programmable controlled switch 128 is thrown as shown to apply the KS(0/1)=KS1 signal on line 116 to key input 127 of a subsequent SD_unit 118.

In one embodiment, each of the KS(0/1) and KS1 signals is at least 16 bytes long (128 bits long) and the SD_unit 118 performs the RC4™ symmetric decryption algorithm as provided by RSA Solutions, Inc. Switch 128 is responsive to a (0/1)=? flag which is stored as plaintext in field 151 of the user's log-in record. In the instant case, flag 151 causes switch 128 to connect key-input 127 to key-supplying line 116. (If the case were such that KS(0/1) is not equal to KS1, flag 151 would have instead caused switch 128 to connect an alternative key-supplying line 126 to key-input 127.)

Data input 129 of the SD_unit 118 receives the signal PriWK1*[KS1] from field 154 of the user's log-in record 150. The plaintext version of this signal is PriWK1 which is a private key belonging to the local workstation 100 (Wk1). This private key, PriWK1 is generated independently of the KS1 key and is generally different from the KS1 key. The PriWK1 key is managed like other private keys in a public/private key system. It is securely kept within workstation 100 and preferably never exposed externally. (Which is why field 174 of in-transit record 170 is blank—or alternatively filled with nonsense {irrelevant} information.)

As is with other keys in an asymmetric public/private key system, the plaintext version PriWK1 of the private workstation key is not purely random and it has to meet certain format requirements as dictated by the public/private key cryptography system that is in use. For example, if ASN.1 notation format is followed, that dictates the number of fields in the bit sequence of the key definition and how those fields may be filled (e.g., what are valid entries). Compliance with such format requirements is checked by applying the output of SD_unit 118 to a first, private-key format checker 119. (Other indications of success in the attempt by SD_unit 118 to decrypt the signal on line 129 could be alternatively or additionally used.) Format requirements can include specific bit lengths or value ranges for exponent and modulus parts of the private key and/or self checking of the generated bit sequence by an embedded parity field or an embedded error detection and correction (ECC) field.

If the PriWK1 output signal of SD_unit 118 does not have a valid format (or unsuccessful decryption is otherwise indicated), the first format checker 119 outputs an active, first blocking signal 104. When active, this first blocking signal 104 prevents another key-supplying switch 105 from closing. Switch 105 supplies an encrypted version, FK_UserX*[PubUK] of the user's file key from a physically secured storage area 106 to a data input of AD_unit 122.

If the output of SD_unit 118 has a bad format for any reason (or unsuccessful decryption is otherwise indicated), the first blocking signal 104 will go active, and the plaintext version 108 of the user's file key will be blocked from being presented to SD_unit 123. As a consequence, the user will be blocked from obtaining the plaintext version 113 of the desired FILE. The putative user will also be denied log-in rights since there is something wrong either with the submitted password 101 or the in-station log-in record 150.

It is seen that the PriWK1 output of SD_unit 118 can have a bad format for any one of the following reasons: (1) the user-submitted password 101 was wrong; (2) field 156 of the user's log-in record did not contain the correct KS(0/1)*[PW*] signal; or (3) field 154 of the user's log-in record did not contain the correct PriWK1*[KS1] signal. Put another way, the user failed to provide both a good password 101 and a properly matching user's log-in record 150.

There is yet another check that is carried out before the user is allowed to log-in. The KS(0/1) signal of line 116 is further delivered to a key input of a further SD_unit 120. In one embodiment, unit 120 performs the RC4 algorithm. The data input of SD_unit 120 receives a PriUK*[KS(0/1)] signal from field 155 of the user's in-station log-in record 150. If all is correct, the resulting output 121 from SD_unit 120 should be the plaintext version, PriUK of the user's private key.

This resulting output signal 121 is applied to a second format checker 111. If the format of signal 121 is invalid for any reason, the second format checker 111 outputs an active, second blocking signal 114 which prevents switch 105 from closing independently of first blocking signal 104. This forced opening of switch 105 again prevents the plaintext version 108 of the user's file key from being released to SD_unit 123, and as a consequence, the user is prevented from obtaining the plaintext FILE 113. In one embodiment, if either of the first format checker 119 or the second format checker 111 detects an invalid format (or there are other indications of unsuccessful decryption attempts by units 118 and 120), this is reported to the operating system, the OS blocks the user from logging in, and the OS informs the user that a log-in error has occurred.

In essence, the combination of private workstation-key format checker 119 and private user-key format checker 111 function as a passport inspector means that automatically checks the user-submitted password 101 against fields 156, 154 and 155 of the user's corresponding in-station passport 150 before granting access privileges to confidential information (e.g., plaintext key 108).

As seen in FIG. 1, if switch 105 closes after both the user-submitted password 101 and the in-station passport 150 successfully pass inspection, the user's encrypted file key signal (FK*) is applied to the data input of AD_unit 122. If the private key generated on line 121 (PriUK) is both valid and matching, AD_unit 122 will output the corresponding plaintext file key FK_UserX on line 108. This then enables SD_unit 123 to produce plaintext file 113. Decrypting unit 123 preferably uses a symmetric algorithm rather than an asymmetric one because the former is faster and decrypting unit 123 is generally asked to decrypt voluminous amounts of data (e.g., FILE* data 109).

Figure 2:
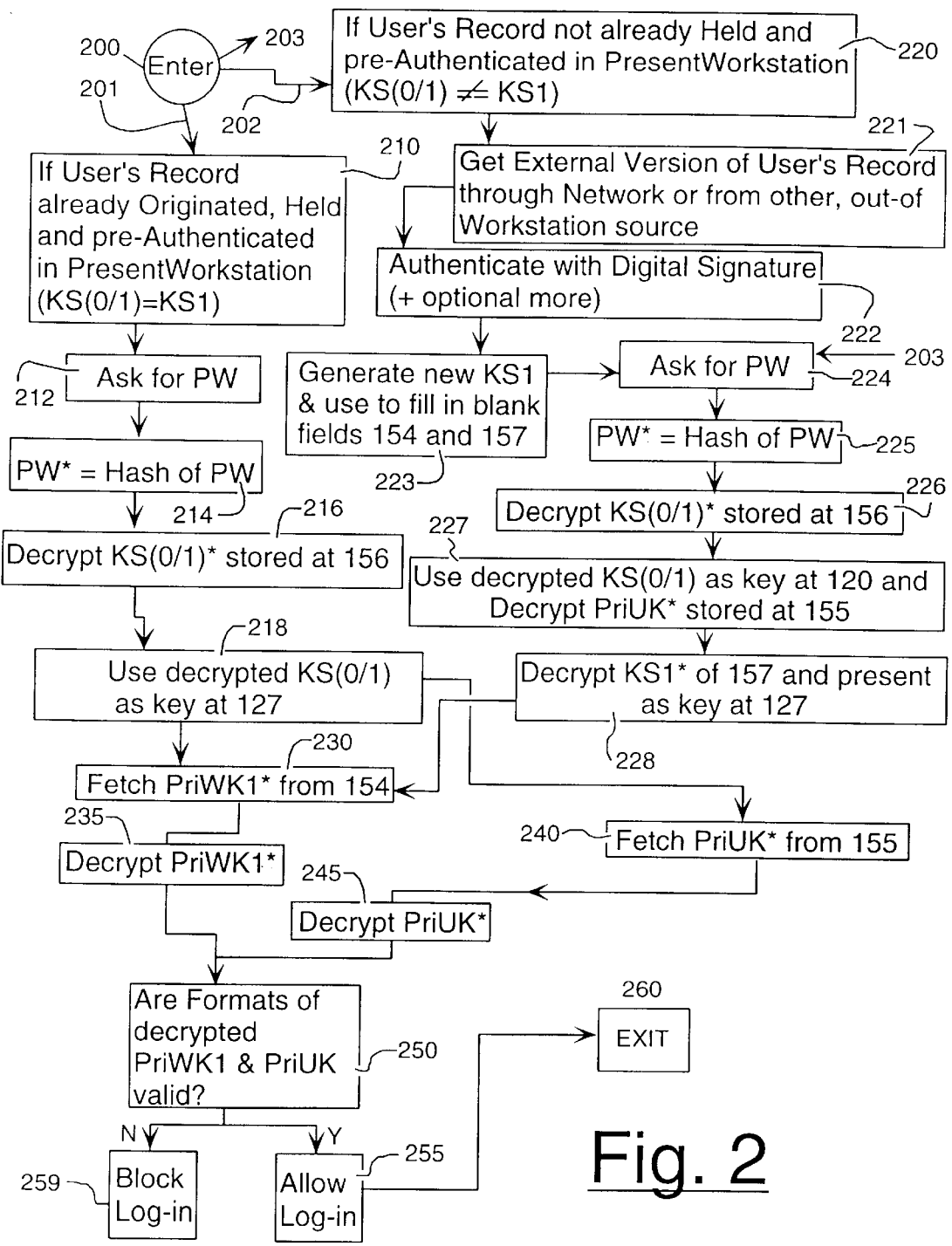

Referring to FIG. 2, the illustrated flow chart includes the just-described log-in method. Entrance is made at 200. Path 201 is followed in the situation that has been initially presented here, namely that the record 150 of the identified user X was originated in, and is already physically secured within the present workstation 100 and that this record has preferably been pre-authenticated by its self-contained digital signature 160. As indicated at 210, flag 151 indicates that KS(0/1) is equal to KS1. (Alternate path 202 would be followed in cases where the user's log-in record is not present in workstation 100 and needs to be imported. Alternate path 203 would be followed in cases where the user's log-in record is present in workstation 100 but was imported into rather than originated in workstation 100.)

Although not specifically shown, step 200 is understood to include the basic steps of obtaining the User_ID of the access-requesting user X and locating a corresponding log-in record 150 (or 170) in which field 152 (or 172) has a matching User_ID.

At step 212, the operating system asks the user to supply the plaintext of his or her password (PW).

At step 214 the password is hashed.

At step 216 the KS(0/1)* signal stored at field 156 is decrypted. The decrypted result is presented to key input 127 at step 218.

At following step 230, the signal PriWK1* is fetched from field 154 of the user's in-station record and decrypted at step 235. Furthermore, the signal PriUK* is fetched at step 240 from field 155 of the user's in-station record and decrypted at step 245. (Step pairs 230–235 and 240–245 can occur one after the other or in parallel.)

At step 250 a determination is made as to whether the formats of both of the decrypted signals PriWK1 and PriUK are valid. If either one is not valid, control passes to step 259 where the attempted log-in by the user is blocked. The operating system may thereafter ask the user to resubmit the password or the OS may take other steps as appropriate.

On the other hand, if each of the decryptions of steps 235 and 245 produced-a properly formatted private key, then the decision step 250 transfers control to step 255. In step 255 the operating system grants log-in to the requesting user. (The user-submitted password 101 and the user's in-station passport 150 have passed inspection.) An exit from the user admitting procedure is taken at step 260.

Returning to FIG. 1, it is seen in summary that both of fields 154 and 155 of the user's log-in record 150 had been inspected for their ability to produce validly formatted, and different private keys (PriWK1 and PriUK_X) based on the user-submitted password 101 and based on the contents of field 156 before the user was allowed to log in. Additionally, each of fields 154, 155 and 156 was covered by the digital signature stored at field 160. The digital signature makes it difficult for a spoofer to tamper with the record 150 in an attempt to pass inspection.

Record authenticator 140 carries out the digital signature verification in workstation 100 by obtaining the user's public key (PubUK_X) from plaintext field 153 of the record 150. Record authenticator 140 uses the fetched PubUK_X and the record's DIGITAL SIGNATURE* 160 to authenticate the signature-covered fields 151–159 of the record. If there is an indication that the user's record had been tampered with, this is reported to the OS, the attempted log-in is blocked, and the user is asked to contact the system administrator for further assistance.

Workstation 100 Viewed as the Originator of a User's Log-in Record

It was assumed above that a pre-authenticated user's log-in record 150 is already originated and securely held within workstation 100 at the time user X tries to log-in through workstation 100. Now it will be described how a user's log-in record is originated from workstation 100.

If no user has previously logged in to workstation 100, a default log-in record is held within the workstation for the system administrator (or the first time owner of the computer) to use and a default password is provided for first-time log-in. The system administrator is then required to provide a new password that is different from the default password. A new record is originated for the system administrator, and the original, default log-in record is scorched to prevent later back door bypassing of the security system. The system administrator is thereafter allowed to log-in under his/her new password and to create additional temporary, default log-in records for subsequently authorized users. Those subsequently authorized users are similarly required to provide respective new passwords, new records are originated for them, and their original, default log-in records, are scorched. It is seen from this that the origination of a user log-in record within workstation 100 and the changing of the user password to be used for that workstation 100 are basically the same process.

Referring to FIG. 1, at the time the system administrator (or any other user) submits his or her new password, a random number generator 110 (or more accurately, a pseudo-random number generator) is activated within a physically secured part of workstation 100. Random number generator 110 produces a password-associated pseudo-random bit sequence, which is preferably at least 128 bits in length. Switch 112 is momentarily closed to apply this newly-generated key signal, named 1st_KS1, to line 115. Line 115 forgets this newly-generated key signal(1st_KS1) after it is once used by record filling units such as 136, 164 and 167 to fill in their respective fields of record 150.

The KS(0/1) signal is equal to the KS1 signal when the record 150 is 'originated' in workstation 100. Accordingly, all fields which are derived from KS(0/1) or KS1 (namely, fields 154–159) are filled with new data based on the newly-generated key signal(1st_KS1) After fields 154–159 are so-filled, the plaintext 1st_KS1 signal is scorched, switch 112 is reopened, and the random number generator 110 is reset so that there will be no long-time stored, plaintext copy of 1st_KS1 after it is consumed by field-filling units such as 136, 164 and 167.

Due to space limitations in FIG. 1, only field-filling units 136, 164, 167 and 140 are shown (for filling respective fields 156, 154, 157 and 160. it is understood from the notations used in FIG. 1 what additional field-filling units are used and how they are connected.

For example field 158 is to contain the KS(0/1)* [PubOTP] signal. Accordingly, it is understood that an additional AE_unit (not shown) is provided for receiving the 1st_KS1 signal—which now equals KS(0/1)—at its data-input and the public key named PubOTP at its key-input and for responsively generating the KS(0/1)* [PubOTP] signal for storage in field 158. The PubOTP signal comes from a trusted source (e.g., a help desk) that provides the corresponding One-Time Password service. Use of the one-time password signal KS(0/1)*[PubOTP] for one-time release of the KS(0/1) key upon provision of a PriOTP key is explained in the above-referenced patent application Ser. No. 08/643,742.

Additional symmetric encrypting units (not shown) are similarly provided for receiving the 1st_KS1 signal—which now equals KS(0/1)—at their key-inputs for responsively and respectively generating the PriUK*[KS(0/1)] signal of field 155 and the DOS.txt*[KS(0/1)] signal of field 159. The plaintext PriUK signal is momentarily obtained from the previous, authenticated log-in record of the same user or from another like trusted source. The plaintext DOS.txt signal is a pre-specified ASCII or DOS text string (e.g., 'This Record is OK') which is also momentarily obtained from the previous log-in record of the same user or from another like trusted source.

During record-origination, SE_unit 136 receives the 1st_KS1 signal at its data input and the hashed PW* signal that was derived from the new password at its key input. The encrypted result is stored in field 156 of the user's record by way of switch 137. Switch 137 is closed to fill field 156 in this instance because a new password is being generated by the user. If a new password were not being generated by the user,—such as in the case where a record with an old password is being imported—switch 137 would have remained open and field 156 would have retained its previous KS0*[PW*] signal, that signal representing an externally-generated key KS0 covered by the hash PW* of the old password.

Additionally, during origination of the user's log-in record 150, AE_unit 167 receives the 1st_KS1 signal at its data input and the user's public key (PubUK_X) at its key input. AE_unit 167 then records the encryption result as signal KS1*[PubUK_X] into field 157 of the record then being originated. The PubUK_X signal can come from plaintext field 153 of a previous authenticated record belonging to the same user or from any other trusted source containing the user's public key.

Moreover, SE_unit 164 receives the 1st_KS1 signal at its key input and the private key (PriWK1) of the record-originating workstation 100 at its data input. Signal PriWK1 is a private key unique to workstation 100 and is physically secured within workstation 100. Source 162 and switch 163 represent an appropriate private-key releasing means for momentarily releasing the plaintext PriWK1 signal to SE_unit 164. One possible source for the plaintext PriWK1 signal is field 154 of the workstation administrator's log-in record as uncovered by SD_unit 118 when the administrator provides his or her password and approves release of PriWK1 for originating the log-in record 150 of User_X. Item 143 represents such an approved release which causes switch 163 to momentarily close. If field 154 of User_X's record were being filled for an imported rather than locally-originated record, release approval 143 may be predicated on an affirmative import-record authenticated signal 142 supplied from record authenticating module 140. The encryption result of SE_unit 164 is stored in field 154 of the user's record as the signal PriWK*[KS1].

Further during record-origination, the user's public key is stored as plaintext in field 153 of the record. The user's public identification (e.g., the user's name or initials) is stored as plaintext in field 152 of the record. Because this record is being originated inside of workstation 100 and is not being imported from elsewhere, flag 151 is set to indicate that KS(0/1) is equal to KS1.

The so-processed user's record 150, with its respective fields 151–159 accordingly filled, is then covered by the user's digital signature, which signature is stored in field 160 of the originated record.

Figure 3:
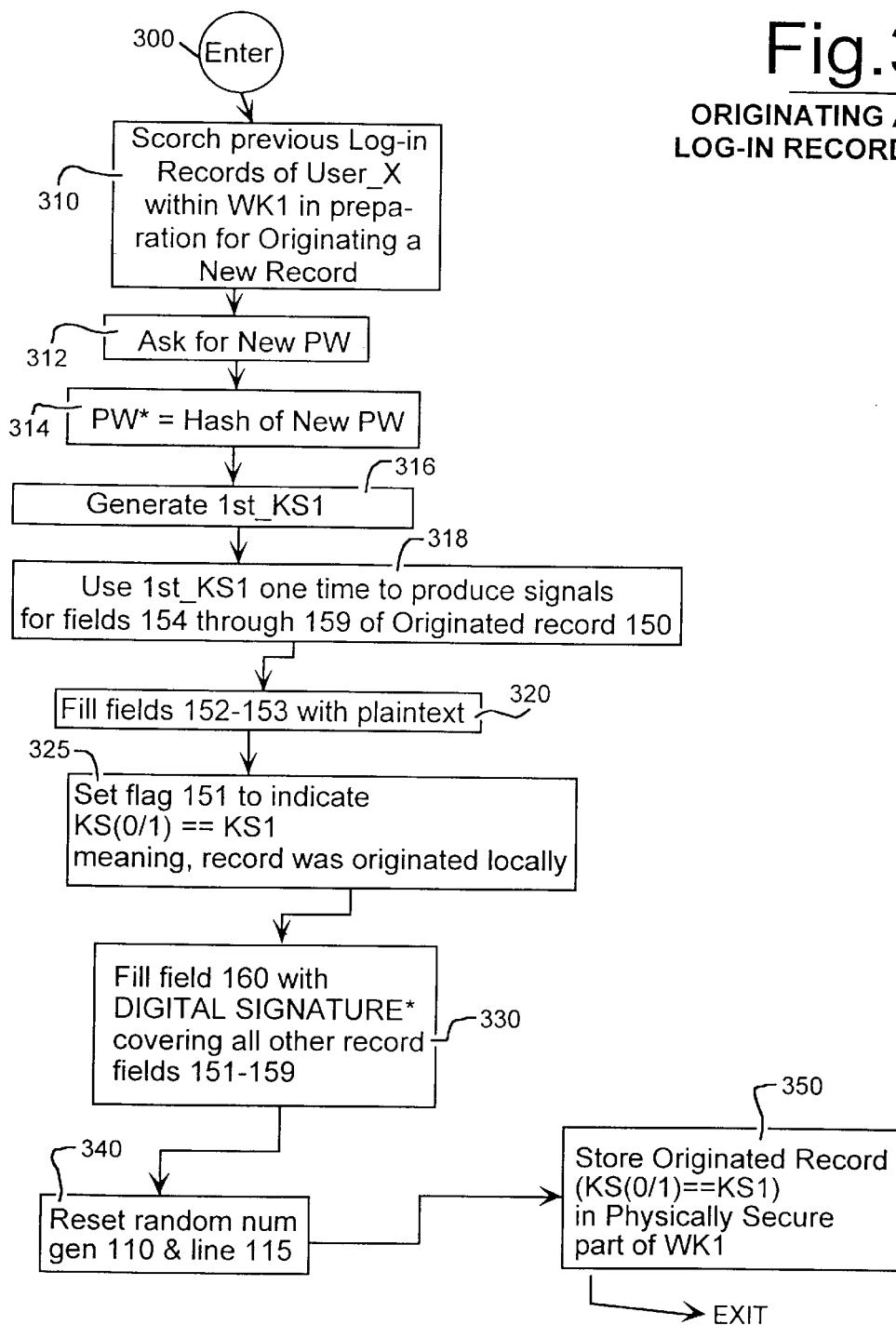
FIG. 3 is a flow chart showing how a user's log-in record with a new password is originated in a first workstation.

A flow chart of this process is seen in FIG. 3. Entry is made at 300. At step 310, if there are any previous Log-in Records for User_X (where user X is creating a new password for him or herself) held within workstation 100 (WK1), these are scorched in preparation for originating a new record that will support the new password. Any data needed from a previous Log-in Record of User_X (such as plaintext data extracted from fields 152–155 and 159) is temporarily stored for consumption in the originating process.

At step 312, the new password is obtained from the user. At step 314, a hash PW* of the new password is generated.

At step 316, a new KS1 signal (1st_KS1). is generated by random or pseudo-random means.

At step 318, the 1st_KS1 signal is used to produce the signals for fields 154 through 159 of the new record. Thereafter, the plaintext of the 1st_KS1 signal is scorched out of memory. Workstation 100 more permanently stores the results (fields 154 through 159) derived from this 1st_KS1 signal as encrypted data in a physically secured portion of workstation 100. In the preferred method of usage, neither the 1st_KS1 signal nor its plaintext copy, KS1, nor any of the encrypted results of fields 154 and 157 are allowed to be exported out of the physically secured portion of workstation 100. PriWK1 is used exclusively within workstation 100.

At step 320, fields 152 and 153 are filled with their corresponding plaintext data for User_X ID and PubUK_X (public key of user X).

At step 325, the (0/1)=? flag 151 is set to indicate that KS(0/1) is the same as KS1. This indicates that the present log-in record originated from within workstation 100 using the KS1 key generated by that workstation.

At following step 330, field 160 of the record is filled with a DIGITAL SIGNATURE* signal covering all of fields 151 through 159. Fewer fields could be covered in an alternate embodiment but that would disadvantageously provide greater opportunity for undetected tampering with the record.

At step 340, the random number generator 110 is reset and line 115 is cleared. Thereafter at step 350, the thusly originated record 150 is stored within workstation 100, preferably in a physically secured area of workstation 100. An exit is taken after step 350.

Workstation 100 Viewed as the Exporter of a User's Log-in Record

Assume next that after having originated a password and a user's record 150 in a first workstation (Wk1) the same user wishes to move to a new workstation (Wk2) and to log in with the same password. The physically secured record 150 is not sent out as is. Instead, a copy of the user's original record 150 is made. Before being exported to the new workstation (Wk2), the copy is modified by import/export module 161 so that fields 154 and 157 of the copy are either blank or filled with nonsense information. Flag 151 is changed in the copy to indicate that KS(0/1) is not equal to KS1. A new digital signature is then generated and written into field 160 of the copy.

The so-modified copy of the user's passport record is now ready for export outside of workstation 100 by way of, for example, conveyance path 190. Depending on the sensitivity of the information involved in the exportable passport copy, conveyance path 190 can be implemented in various ways ranging from a relatively unsecured conveyance such as transmission over a public Internet to an extremely secured conveyance such as floppy-diskettes hand-carried by a trusted and armed courier.

Record 170 can be viewed as the resulting in-transit copy as it moves along conveyance path 190 towards another workstation. What was KS1 inside workstation 100 is now KS0 (an externally generated key) as far as the receiving other workstation is concerned.

Note that fields 174 and 175 of the in-transit record copy 170 are no longer covered by a same key. Note that fields 174 and 177 are either blank or filled with nonsense information. If this in-transit copy 170 of the user's record is intercepted by an unintended party, the missing data of fields 174 and 177 will make it difficult to spoof a credible passport record based on the intercepted record 170. Note additionally that the digital signature of field 180 makes it difficult to tamper with the intercepted record 170 and to try to spoof a receiving workstation into believing that the tampered-with version is a legitimate passport record.

Figure 4:
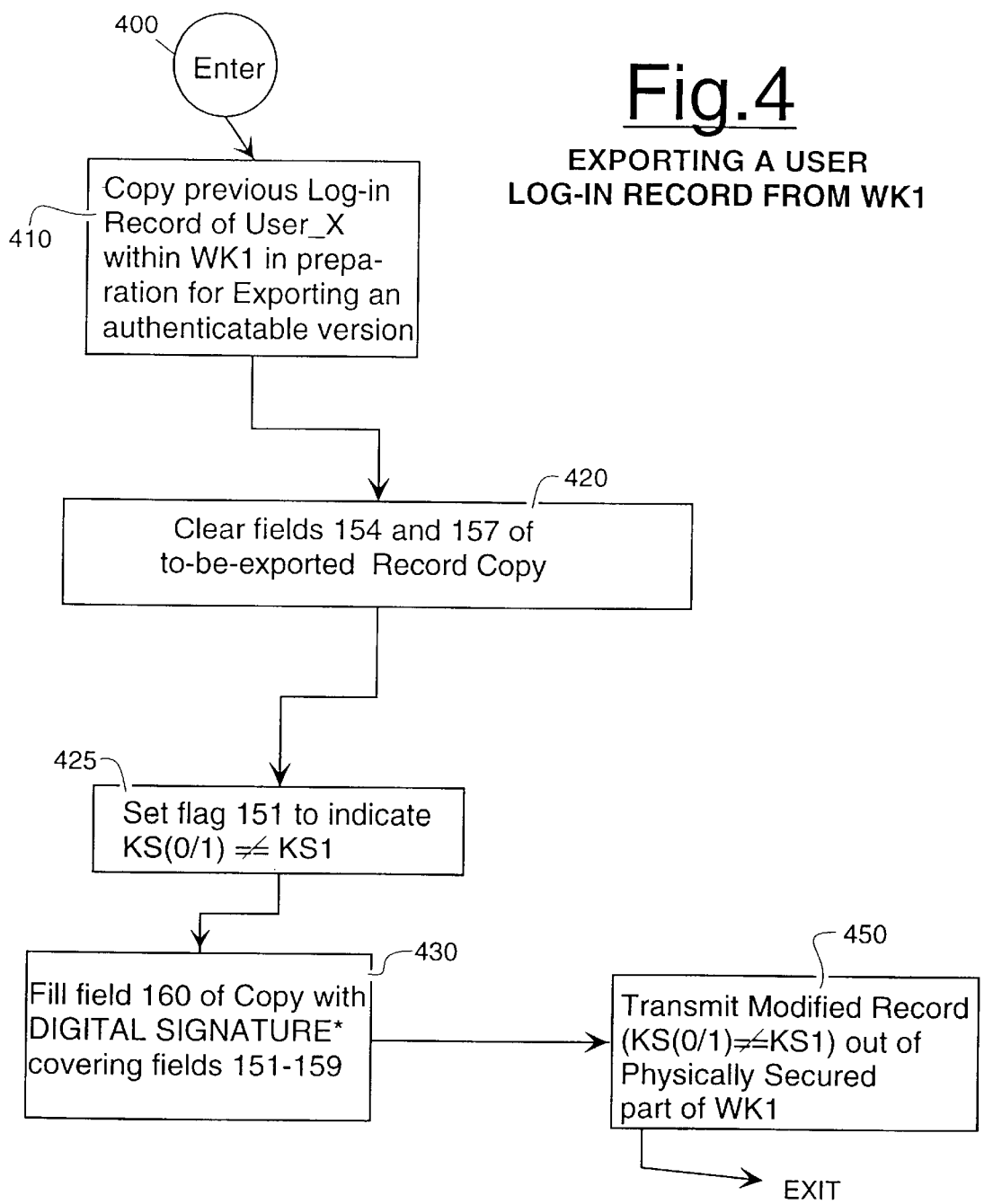
FIG. 4 is a flow chart showing how a user's log-in record with a predefined password is copied for export out of a holding workstation.

FIG. 4 shows a flow chart of the record-exporting process. Entry is made at 400. The user_X or another authorized person (administrator) is understood to have successfully logged-in into workstation 100 to gain access to User_X's Log-in Record 150 and to have requested an export operation for that specific record. At step 410, a copy of User_X's Log-in Record 150 is made. At step 420, fields 154 and 157 of the copy are blanked or filled with nonsense information. At step 425, the flag in field 151 of the copy is modified, to indicate KS(0/1) does not equal KS1. At step 430, field 160 of the copy is overwritten with a new digital signature covering fields 151–159. At. step 450, the modified copy is transmitted out of the physically secured area of workstation 100 for conveyance by desired means (wire, diskette, computer-readable badge, or other) to a targeted other workstation (e.g., Wk2).

Workstation 100 Viewed as the Importer of a User's Log-in Record

In the next instance, workstation 100 is to be considered as one that is importing a user log-in record 170 from an external source. The external log-in record 170 was generated by another workstation (say, Wk2) similar to workstation 100. KS0 was the key used in the outside workstation (Wk2) prior to export of the in-transit record 170. Fields 174 and 177 were blanked out by Wk2 during its export process.

It is understood for this instance that User_X does not yet have a log-in record within Wk1 (100). User X would like to log-in into workstation 100 using the same password he or she used at the other workstation (Wk2, not shown).

Referring to FIG. 2, at entry point 200 the user supplies his or her user identification (152) and requests log-in permission. The system (100) notes that there is no corresponding log-in record for the so-identified user and asks the user to identify an importation source by way of which a corresponding passport record (170) will be imported into workstation 100. The utilized importation channel (190 of FIG. 1) can be any appropriate means including a digital data communications network (e.g., Internet), or a floppy diskette or a computer-readable identification badge. If desired, workstation 100 can be configured to require a specific one or more means 190 such as a computer-readable identification badge or a secured communications network rather than giving the user a choice among all available importation channels. Path 202 is followed in this case because, as indicated at 220, the user's record had not already been imported into workstation 100 and authenticated. Field 171 of the imported 170 should indicate that KS(0/1) does not equal KS0.

Step 221 represents the process of obtaining the not-yet-admitted record 170 from an external source by way of a specified importation channel.

At step 222 the digital signature stored in field 180 of the fetched record 170 is used to authenticate (validate) the contents of the remaining fields 171–179. If a mismatch between the digital signature and the rest of the record 170 is found in step 222, the log-in request is denied and the user is advised by the computer 100 that the fetched passport record 170 is defective.

After authentication with the digital signature (step 222), fields 174 and 177 still remain essentially blank. Although it could be, the private workstation key PriWK1 of 162 is not necessarily released at this time by gatekeeping mechanism 143/163. (Gatekeeping mechanism 143/163 includes switch 163 and release approval module 143.)

The putative user's identity can be further checked at this stage (before releasing PriWK1 162) by asking for a record-associated password and using the submitted password to uncover the data of field 176. The uncovered KS0 key (176), if correct, can then be used to uncover the data of corresponding fields 179 and 175.

Note that step 222 contemplates optional further authentications in addition to authentication by the digital signature. Checking the user-provided password (PW) against fields 176, 179 and 175 is one, but not the only or exclusive way to carry out the optional further authentications of step 222 prior to allowing the gatekeeper 143/163 to release the private workstation key (PriWK1) 162 for use in subsequent step 223.

As part of the optional further verifications of step 222, the user is asked to provide his or her password (PW) and user ID. The ID can be compared against plaintext field 172 for a match as a simple first test. Next, the user-supplied plaintext password PW is brought in on line 101 for hashing by unit 130. The hashed PW* signal is then presented to SD_unit 117. Signal KS0* is taken from field 176 of the suspect record 170 and applied to the data-input of SD_unit 117. In response, unit 117 should produce the plaintext signal KS0 on line 116. This signal on line 116 is next applied to the key-input of SD_unit 138. The DOS.TXT* signal of field 179 is applied to data-input 135 of the same SD_unit. In response, SD_unit 138 should produce a valid plaintext version of an agreed-upon text string (e.g., 'This record is OK'). Unit 139 checks the output generated by SD_unit 138 against the agreed-upon text string for a match. If there is no agreement, the user is denied entry and the computer indicates that the supplied password appears to be wrong. The gatekeeper 143/163 is blocked from releasing key 162 and step 223 is not entered into.

As an optional furtherance or alternative to the DOS.TXT check, the KS0 signal on line 116 is applied to the key-input of SD_unit 120 while the PriUK* signal from field 175 of the suspect record 170 is applied to the data-input of unit 120. In response, SD_unit 120 should produce a valid version of the user's private key, PriUK. Format checker 111 tests the format of the generated signal which appears on line 121. If there is a format error, the user is again denied log-in and advised that the submitted password is not correct. The gatekeeper 143/163 is blocked from releasing key 162 and step 223 is not entered into.

As an alternate to, or in addition to these optional further tests of step 222, the system administrator may choose (or the machine system 100 may be configured) to perform yet other identification checks for verifying that user X is whom he or she claims to be and that the imported record 170 is authentic before releasing the private workstation key 162 through gatekeeping mechanism 143/163. These additional tests can be based on timing and/or choice of passport conveyance means. For example, system 100 may be set up such that passport records may only be validly imported at certain times during the day. If a user tries to import a record outside of these allowed time windows, the log-in attempt will be denied.

As a further example, exclusive use of a particular electronic badge reader may be required for validly conveying the putative passport record 170 into workstation 100. If the user does not have a compatible badge or the badge fails to supply the appropriate passport record by way of the badge reader, the requested log-in may again be denied.

These are merely examples of the additional measures that may be taken to verify the identity of the user and the authenticity of the putative record 170 before the gatekeeping mechanism 143/163 releases the private workstation key 162. Those skilled in the art can choose to add equivalents or alternates based on the foregoing examples. A less restrictive approach is simply to let any already-admitted user release the PriWK1 162 for any incoming external passport 170 that comes in by any channel 190 (e.g., by wire or badge), at any time, after testing for lack of tampering by the digital signature method or by any other equivalent method. As explained above, the plaintext PriWK signal may be derived from field 154 of the log-in record 150 of an already-admitted user by way of SD_unit 118. In essence, each already-admitted member of the club is authorized under this simple scheme to admit a next member into the club at any time irrespective of where that next member is coming from (irrespective of what channel 190 is used to bring that next member's passport 170 to the front door of system 100).

After the digital signature authentication and/or other optional verifications are successfully completed at step 222, the gatekeeping mechanism 143/163 momentarily releases the private workstation key PriWK1 to the data-input of SE_unit 164. At the same time, random number generator 110 is activated and switch 112 is momentarily closed to apply a new KS1 signal onto line 115. (Switch 137 remains open in this instance.) This new, randomly-generated KS1 is generally different from that which may have been generated for another user's record where the latter record originates in workstation 100.

At this stage of the explanation, the imported record 170 is to be understood to assume the position shown as 150 in FIG. 1. The previously blank field 154 is now filled in with the PriWK1* [KS1] signal generated by SE_unit 164 as indicated in step 223. The previously blank field 157 is filled in with the KS1* [PubUK_X] signal generated by AE_unit 167. The user's public key (PubUK_X) is obtained from plaintext field 173/153. If not already done, field 151 is modified to indicate that KS(0/1) does not equal KS0. A new digital signature is written into field 160 to cover fields 151–159. Now the imported record is deemed to be accepted by workstation 100 as a legitimate passport record. (The newly applying user X is now admitted as a member to the club defined by all other users Y, Z, etc., whose respective passports 150 are already physically secured within workstation 100 by virtue of either having originated in workstation 100 or having been successfully imported into workstation 100. It is within the contemplation of this disclosure to permit members to be expelled from club membership autocratically or by vote. For example, members having administrator privileges may be empowered to erase the in-station log-in record 150 of a given user at will.)

After his or her in-transit passport 170 is successfully imported and admitted, path 203 of FIG. 2 will be followed the next time the same user wishes to log into workstation 100.

Log-in by way of path 203 or continuing from step 223 proceeds as follows. At step 224 the user is asked to supply his or her password and user ID (if not earlier so done). The user ID is used to locate the matching in-station passport 150 based on field 152. At step 225 the password is hashed. At step 226 the contents of field 156 are deciphered by SD_unit 117 based on the supplied password. At step 227 the signal generated on line 116 is applied to the key-input of SD_unit 120. The contents of field 155 are then decrypted to produce PriUK on line 121.

At step 228, AD_unit 124 obtains the KS1* signal from field 157 and responsively generates the KS1 signal on line 126. Switch 128 applies this KS1 signal to the key-input 127 of SD_unit 118.

Control next passes to step 230 where the remainder of the log-in inspection procedure continues as it did for path 201. Steps 240 and 245 do not need to be carried out because PriUK* was decrypted in step 227.

Pre-OS Bootup Authentication Using the Passport Record

Passport record 150 can be used to control which users are allowed to boot-up workstation 100 to an extent necessary for intelligibly accessing secured files. The DOS.TXT* data of field 159 is used for this operation.

Figure 5:
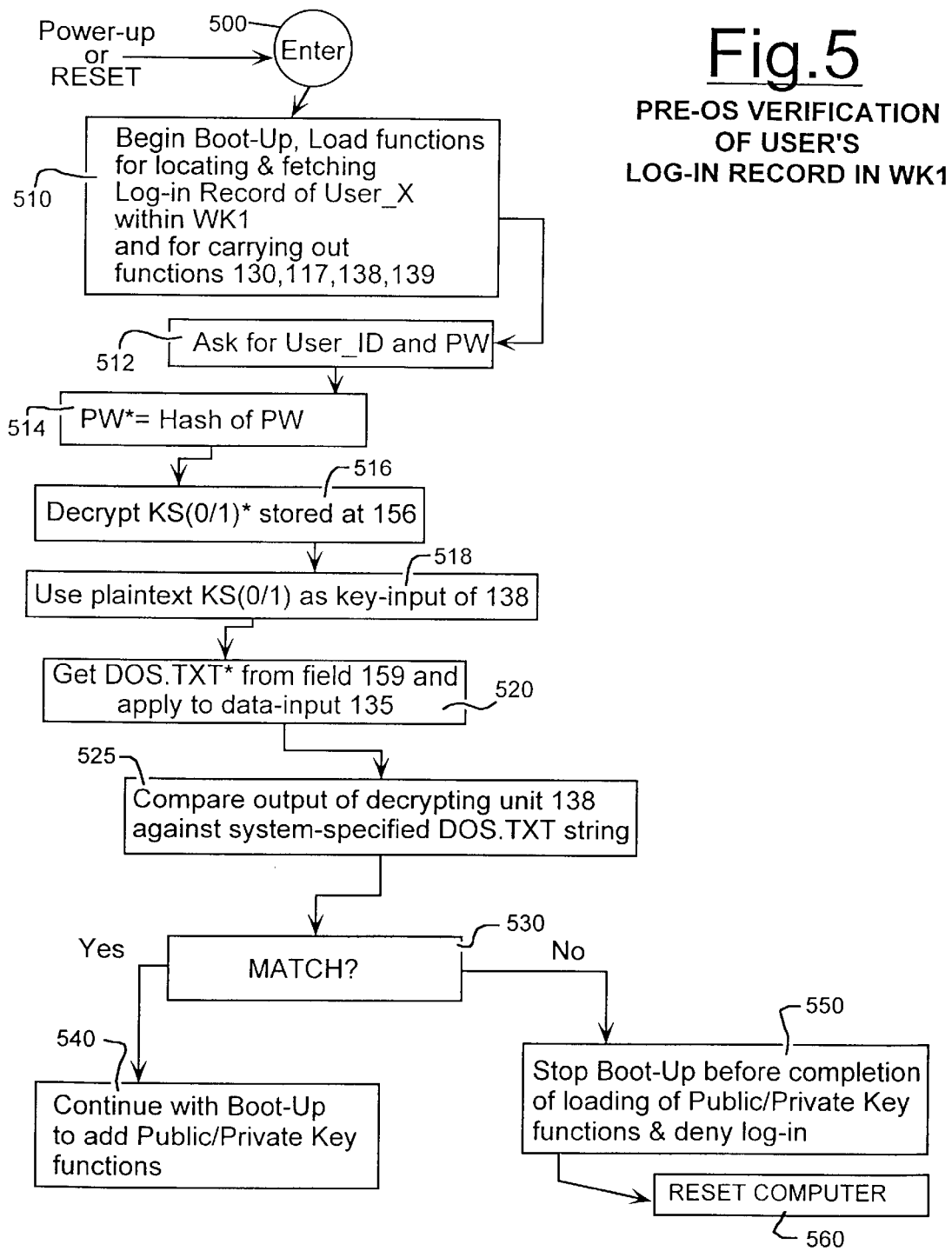
FIG. 5 is a flow chart showing the log-in record may be used for partial authentication prior to full boot-up of the operating system.

Referring to FIG. 5, a workstation power-up occurs, or a reset is applied to workstation 100 at step 500.

At step 510, workstation bootup begins to the extent necessary for enabling elementary operations such as locating and fetching the log-in record 150 of an identified user (the one who is booting up workstation 100). The enabled elementary functions at step 510 further include those for carrying out hashing function 130, symmetrical decryption function 117, symmetrical decryption function 138, pre-OS verification function 139 and basic user interface functions such as display and keyboard. More complex functions, and in particular the cryptographic algorithms used by asymmetric decrypting units 122 and 124 are not yet enabled for workstation 100 at this stage.

At step 512, the booting-up user is asked for his or her password and user ID.

At step 514 the password is hashed by hashing module 130.

At step 516 the user passport record of the identified user is fetched and the data of field 156 is applied to SD_unit 117.

At step 518 the output of unit 117 is applied to the key-input of SD_unit 138.

At step 520 the contents of field 159 are applied to data-input 135 of unit 138. The output of unit 138 is supplied to pre-OS verification unit 139.

At step 530 module 139 compares the output of unit 138 against a pre-agreed-upon system string. If there is a match (yes) normal bootup is continued as indicated by step 540 to enable the public/private cryptography functions of units such as 122 and 124. (It is understood that the pre-agreed-upon system string does not have to be DOS text and instead can be any bit sequence of an agreed-upon length or terminated by an agreed-upon termination sequence.)

On the other hand, if there is no match at step 530, the bootup process is halted before the public/private cryptography functions are enabled, as indicated at step 550. In one embodiment, the computer is reset as indicated at step 560 to bring control back to entrance point 500. The unauthorized user is thereby prevented from booting up the workstation 100 without a proper password and proper passport record, and more particularly that user is blocked from enabling the public/private key cryptography functions that are needed for intelligibly accessing secured files.

In an alternate embodiment, step 550 allows bootup to continue but configures the workstation 100 such that intelligible access to all secured files is blocked. In this alternate embodiment, the user is given access to unsecured programs and data files so that he or she can carry out unsecured functions on that workstation.

Figure 6:
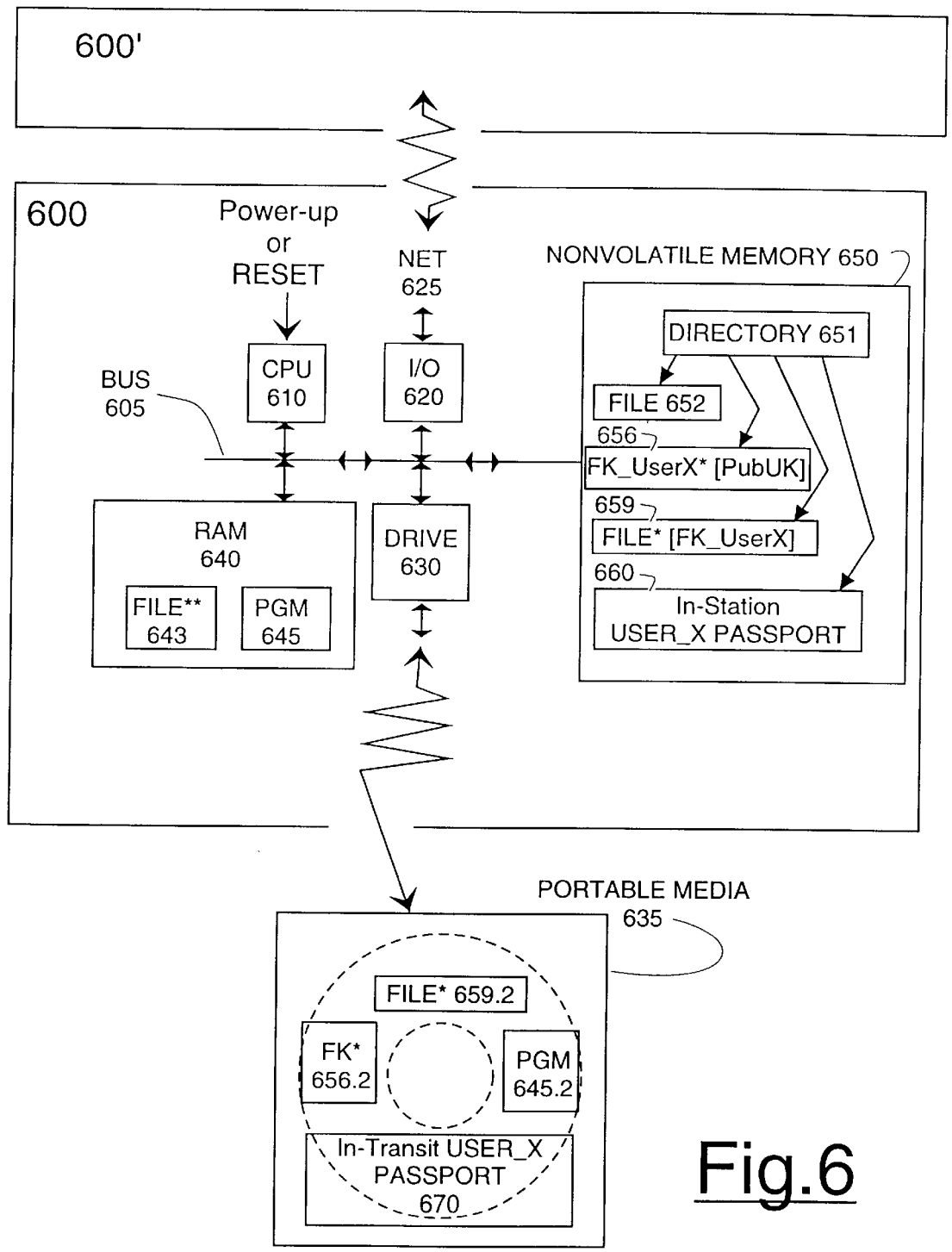
FIG. 6 is is a block diagram showing internal hardware and software of a machine-implemented system in accordance with the invention.

FIG. 6 is a block diagram of a computer system 600 that may be used as a workstation in accordance with the invention. Computer system 600 includes a system bus 605 coupling a system memory 640 such as a random access memory (RAM) to a plurality of other system resources including a system CPU 610, system I/O 620, an intersystem electromagnetic data conveyance means 625 (e.g., a wire, radio or optical fiber link), an intersystem physical data conveyance means 630 (e.g., diskette or CD-ROM or DVD drive), and a nonvolatile memory subsystem 650.

Portable media 635 (e.g., a floppy diskette or a CD-ROM or other like removable media) is removably and operatively couplable with system 600 by way of the intersystem physical data conveyance means 630. An appropriate metal housing or other physical securing means is understood to protect portions of system 600 that store or carry sensitive plaintext data (e.g., FILE 643**).

The system memory 640 may comprise assorted types of high-speed random access devices into which immediately executable code may be stored. System memory 640 can include one or more of static RAM (SRAM), dynamic RAM (DRAM), and other like devices. Typically at least part of the system memory 640 is volatile, meaning data is lost and must be rewritten when power is lost. It is not outside the contemplation of the invention to have system memory 640 defined partly by non-volatile random access memory devices such as flash EEPROM. Often the computer system 600 will include a small boot ROM (Read Only Memory, not shown) coupled to the CPU 610 for power-up and other basic re-bootings of the system.

Plaintext versions of confidential information such as that of FILE 643, FILE 113 (FIG. 1), KS(0/1), PriWK1, PriUK, and so forth are preferably placed only in the volatile portions of system memory 640 for short-term use as needed, and thereafter immediately scorched (erased to an extent that removes the possibility of simple recovery).

When system 600 boots-up in response to a RESET or Power-Up, various executable and data files are automatically loaded from the nonvolatile subsystem 650 or from elsewhere (e.g., from system I/O 620) into system memory 640 to thereby create a collection of program and data structures within system memory 640. These structures normally include executable instruction code (e.g., program 645) that can be immediately and usefully executed by a responsive data processing unit such as the illustrated central processing unit (CPU) 610 of FIG. 6 or by non-centralized multiple data processing units (not shown) that may be further or alternatively coupled to bus 605. Program 645 is understood to at least define executable instructions for causing system 600 to carry out the machine implemented security steps described herein.

The system I/O module 620 uses bus 605 for transferring data between one or more of the illustrated portions of system 600 and external devices. In one embodiment, the system I/O module 620 may couple the illustrated system bus 605 to a variety of external resources such as a user terminal (e.g., keyboard, monitor, and badge reader) and the electromagnetic signal transceiving means 625.

The physical data conveyance means 630 can be defined by data transfer devices such as floppy diskette drives, tape drives, CD-ROM drives, smart card drives, and other such means by which data recorded on transportable media 635 can be brought into system 600 or copied and carried away from system 600.

The nonvolatile memory subsystem 650 typically includes a drive (not separately shown) and a nonvolatile data storage medium (not separately shown) onto which data may be nonvolatilely stored and from which data may be retrieved. The data storage medium may be in the form of a magnetic hard disk, or a floppy diskette, or a re-writable optical disk, or other such non-volatile, randomly accessible, re-writable media. ROM or Flash EEPROM may be alternatively used in carrying out some or all of the nonvolatile data storing functions of the disk subsystem 650.

Data is typically recorded on the nonvolatile subsystem 650 to define a directory structure 651 and a plurality of files (not all shown) such as plaintext file 652, secured file 659, and User_X's in-station passport record 660. (The in-station passport 660 has a data structure such as shown at 150 of FIG. 1 while the below mentioned in-transit passport 670 has a data structure such as shown at 170.)

Directory structure 651 points to, and defines the storage organization of each of the stored files or records. Directory structure 651 may further store various levels of OS-defined permission flags with respect to each file. Although not shown, the disk subsystem 650 may temporarily contain plaintext file copies derived from one or more encrypted files by way of decryption.

Although not further explicitly shown in FIG. 6, disk subsystem 650 may further store: (a) software instructions for causing CPU 610 to carry out all or at least part of the machine-implemented, data processing functions described herein and (b) secured versions of various keys such as users' file keys 106 (FIG. 1). Element 656 represents one such secured file key belonging to User_X. Element 656 can be an independent record or part of a file label attached to element 659.

All or various parts of the data recorded on the disk subsystem 650 may be respectively brought into subsystem 650 or copied out from subsystem 650 through a variety of means including physical data conveying means 630 and/or I/O means 620/625. The latter collection of pathways may include but are not limited to floppy diskettes, compact-disks (CD-ROM), tape, by displaying intelligible information on a video monitor, by printing out information onto paper, and by over-a-network data movement using a file server computer or the like.

For sake of example it will be supposed here that system 600 is an in-office machine and an authorized User_#X wishes to take a current copy 659.2 of secured file 659 home to work with on his/her home computer. Although not shown, the home computer can have the same basic structure 600 as that of the in-office computer with the exception that a current copy of file 659 does not yet reside within the home computer. The home computer (shown only as a block) is referenced herein as 600'. The home computer may also lack copies of elements 656, 660 and 645.

The file copy 659.2 and key copy 656.2 can be each made by passing signals representing the respective, algorithmically-secured data from the physically secured confines of the nonvolatile subsystem 650, over system bus 605 and through data conveyance means 630 onto the transportable (nonvolatile) media 635. The copies 659.2 and 656.2 are not physically secured because they now reside in transportable media 635 but they continue to be algorithmically-secured.

In addition to the copied File* 659.2 and File-Key* 656.2, User_#X may also export onto transportable media 635, an in-transit version 670 of his/her passport in-station record 660. The user may also record record processing software instructions 645.2 that are targeted for his/her home computer for causing that home computer 600' to function in accordance with the record-using methods described herein.

If for some reason User_#X loses possession of transportable media 635, the File* portion 659.2 and File_Key* portion 656.2 recorded thereon continue to remain algorithmically-secured by virtue of their being still encrypted. The in-transit passport portion 670 also remains algorithmically-secured for the reasons explained above.

Once at home, authorized User_#X can unlock File* portion 659.2 by importing the passport portion 670 if it has not yet been imported into home computer 600' and by supplying the password he or she used on the office machine 600.

If our exemplary User_#X decides to change his/her password on the home machine 600', that can be done at the home site through the password originating process described above. If our exemplary User_#X decides to also use the new password on the office machine 600, that can be done by exporting the passport record that was originated in machine 600' back to the office machine 600.

Although the above discussion in relation to transportable media 635 described the conveyance of all copies 659.2, 656.2 and 670 from one computer 600 to a second computer 600' by way of the so-called sneaker-ware path (by using transportable media 635 to convey the file between the two machines), a similar process can be carried out for one or more of these copies through electromagnetic signal transmission by way of network connection 625 between the two machines 600 and 600'. The preferred method is to split the transmission along different channels so that FILE* 659.2 is conveyed by media 635 while passport record 670 is separately conveyed by path 625 and File_Key* portion 656.2 is separately conveyed by yet another distinct means and/or at a different time. The split transmission of these various parts helps to further reduce the likelihood of compromise.

Signal transmission path 625 does not have to be a secured channel because the transmitted FILE* portion 659.2 is protected by encryption. The transmitted passport record 670 is also protected by the in-transit data structure described above. Note that when this alternate mode is used of moving record 670 by way of electromagnetic signal transmission 625, the user is freed from the burden of having to carry about a physical ID badge and from having to worry about losing the badge.

As such, a convenient and secure system has been described for allowing each of multiple users to move from machine to machine, and to change their passwords when and where they please, and to also securely move confidential files about from machine to machine.

The above disclosure is to be taken as illustrative of the invention, not as limiting its scope or spirit. Numerous modifications and variations will become apparent to those skilled in the art after studying the above disclosure.

By way of examples, the above methods can be used in combination with one or more of the further security methods described in the above-cited U.S. Pat. No. 5,768,373 entitled, A METHOD FOR PROVIDING A SECURE NON-REUSABLE ONE-TIME PASSWORD; and U.S. Pat. No. 5,953,419 entitled, CRYPTOGRAPHIC FILE 9 LABELING SYSTEM FOR SUPPORTING SECURED ACCESS BY MULTIPLE USERS; and U.S. Pat. No. 5,694,428 entitled, SYSTEM FOR AUTOMATIC DECRYPTION OF FILE DATA ON A PER-USE BASIS AND AUTOMATIC RE-ENCRYPTION WITHIN CONTEXT OF MULTI-THREADED OPERATING SYSTEM UNDER WHICH APPLICATIONS RUN IN REAL TIME.

The data structures of the illustrated in-station and in-transit passport records (150, 170) can be modified to add additional features or remove nonessential features (e.g., the DOS.TXT* feature) as seen fit. The disclosed security measures are not limited to use in desktop computers or portable computers. They can be employed in all forms of data processing equipment where it is desirable to limit intelligible access to digitized information.

Given the above disclosure of general concepts and specific embodiments, the scope of protection sought is to be defined by the claims appended hereto.

What is claimed is:

1. A manufactured passport signal structured for operable use by a machine system that maintains confidential digital information in encrypted form while allowing for intelligible access to such confidential information by users who are authorized for access by a combination of a user-associated password and a user-associated passport said manufactured passport signal defining for each of an associated one or more authorized users, a passport data structure comprising:

(a) a first field containing a first secured-by-encryption key, where said first secured key is covered by a first covering signal derived from a valid password of the passport-associated user;

(b) a second field containing a second secured-by-encryption key, where said second secured key is covered by a plaintext version of the first secured key; and (c) a third field that is blank or is filled with irrelevant information,
    (c.1) where said third field can be overwritten to contain a third secured-by-encryption key that is different from the first secured key in situations where the corresponding passport data structure is physically-secured within said machine system; and (d) where said machine system requires local presence of a physically-secured, in-system version of the corresponding passport data structure and a verified local uncovering from said in-system version of the corresponding passport data structure of the secured keys in the second and third fields of the in-system version before the machine system locally grants to a requesting user, intelligible access to corresponding confidential information.

2. The manufactured passport signal of claim 1 wherein said passport data structure further comprises:

(e) a fourth field storing a digital signature that covers data contained in at least the first, second and third fields.

3. A manufactured passport signal according to claim 2 and further characterized as being transmitted over an unsecured communications network.

4. A manufactured instruction signal structured for instructing a prespecified, instructable machine to carry out a method for providing intelligible access to algorithmically-secured data in response to an access request, wherein the access request includes submission of a password and submission of an identification of a requesting user, said instruction-defined method comprising:

(a) finding a machine-readable passport associated with the submitted identification, wherein said passport includes:
  (a.1) a first field having a user identification matching the submitted identification and associating the passport with a corresponding user;
  (a.2) a second field containing a first secured key derived from a valid password of the passport-associated user;
  (a.3) a third field containing a second secured key covered by a plaintext version of the first secured key; and
  (a.4) a fourth field containing a third secured key that is different from the first secured key; and
  (a.5) a fifth field containing a fourth secured key, where a plaintext version of the fourth secured key covers the third secured key of the fourth field;
(b) using the submitted password to attempt decryption of the first secured key, said attempt producing a putative first uncovering of the first secured key;
(c) using the putative first uncovering to attempt decryption of the second secured key, said attempt producing a putative second uncovering of the second secured key; and
(d) attempting to generate a plaintext version of the third secured key by using the fourth field in combination with at least the second field.

5. The manufactured instruction signal of claim 4 wherein said step (d) further uses the third field and the fifth field for attempting to generate the plaintext version of the third secured key.

6. The manufactured instruction signal of claim 4 and further wherein said passport further includes:
  (a.6) a sixth field storing an origination flag that indicates whether the plaintext version of the first secured key originated locally or was imported; and wherein said instruction-defined method performs the steps of:
  (d.1) in response to the origination flag indicating that first secured key originated locally, using the putative first uncovering to attempt decryption of the third secured key; and
  (d.2) in response to the origination flag indicating that first secured key did not originate locally, using the putative first uncovering in combination with an attempted uncovering of the second secured key and an attempted uncovering of the fourth secured key to attempt decryption of the third secured key.

7. The manufactured instruction signal of claim 4 and further wherein said instruction-defined method does not require involvement by a system administrator or another, like-privileged user in addition to involvement by the requesting user for providing said intelligible access to the algorithmically-secured data if the machine readable passport is found to be physically secured within a local workstation of the requesting user and pre-authenticated within said local workstation.

8. The manufactured instruction signal of claim 7 and further wherein said instruction-defined method does require involvement by a system administrator or another, like-privileged user in addition to involvement by the requesting user for providing said intelligible access to the algorithmically-secured data if the machine-readable passport is to be formed by importing an in-transit version of the passport into a physically secured area within the local workstation of the requesting user, where the corresponding fourth field and fifth field of the in-transit version are each blank or filled with irrelevant information, and the system administrator or other, like-privileged user has to release a plaintext version of the third secured key for use in filling in the fourth field of the machine-readable passport during its formation.

9. The manufactured instruction signal of claim 4 and further wherein said instruction-defined method does not require involvement by a system administrator or another, like-privileged user in addition to involvement by the requesting user for changing the valid password of the requesting user if the machine-readable passport is found to be physically secured within a local workstation of the requesting user and pre-authenticated within said local workstation.

10. A manufactured signal structured for loading into a prespecified, programmable machine and thereby causing the machine to carry out a method for providing intelligible access to algorithmically-secured data in response to an access request, wherein the machine has a physically secured storage wherein the access request includes submission of a user identification and submission of a putative password of a user identified by said user identification, where said access providing method comprises:
  (a) obtaining from said physically secured storage, a machine-readable passport that is associated with the submitted identification, wherein said passport includes:
    (a.1) a first field containing data of a first algorithmically-secured key which data is derived from a valid password of a passport-associated user and from a plaintext version of the first secured key;
    (a.2) a second field containing data of a second algorithmically-secured key that is covered by said plaintext version of the first secured key; and
    (a.3) a third field containing data of a third algorithmically-secured key that is different from the first algorithmically-secured key; and
    (a.4) a fourth field containing data of a fourth algorithmically-secured key
      (a.3a) where the third secured key of the third field is covered by a plaintext version of the fourth secured key;
  (b) using the submitted, putative password to attempt a decryption of the first secured key, said attempt producing a putative first uncovering of the first secured key from the data of said first field;
  (c) using the putative first uncovering to attempt a further decryption of the second secured key, said further attempt producing a putative second uncovering of the second secured key from the data of said second field; and
  (d) attempting to generate a plaintext version of the third secured key by trying to decrypt the data of said fourth field while using at least the putative first uncovering for forming a decryption key for decrypting the data of said fourth field.

11. The manufactured signal of claim 10 and further wherein said access-providing method allows one or more of a system administrator and other like-privileged users to erase said identification-associated passport from the physically secured storage either autocratically or by vote and to thereby block the passport-associated user from gaining intelligible access to the algorithmically-secured data by way of said machine.

12. The manufactured signal of claim 10 and further wherein
  said passport includes:
    (a.5) a fifth field containing an algorithmically-secured data string that is produced by using the first algorithmically-secured key to cover a plaintext version of said algorithmically-secured data string; and said access-providing method includes the steps of:

(e) attempting to generate the plaintext version of the algorithmically-secured data string by trying to decrypt the data of said fifth field while using the putative first uncovering as a decryption key; and (f) checking the generated plaintext version of the data string for correctness, and if the check fails, denying entry into the machine based on said obtained passport and the supplied user identification, and the submitted putative password.

13. A manufactured instruction signal adapted for instructing a prespecified, instructable machine to carry out a machine-implemented method for protecting algorithmically-secured data from being intelligibly accessed by other than authorized users, where an access request includes submission of a putative password of an authorized user, and submission of a putative identification of the same authorized user to a request-servicing station that has physically secured, storage and processing facilities, where said instructed method comprises:

(a) requiring presentation within said physically secured, storage facilities of the request-servicing station, of an authenticated passport record associated with a user identified by the putative identification, where the presented passport record includes:

(a.1) a first field containing data of a first algorithmically-secured key where said first secured key is derived from a valid password of the passport-associated user and from a first counterpart-plaintext key that is temporarily originated in either the physically secured facilities of the request servicing station or in physically secured facilities of a like, external station;

(a.2) a second field containing data of a second algorithmically-secured key, where said second secured key is derived from a second counterpart and private key of the passport-associated user and from said first counterpart plaintext key;

(a.3) a third field containing data of a third algorithmically-secured key where said third secured key is derived from a public key of the passport-associated user and from a third counterpart-plaintext key that is temporarily created in the physically secured facilities of the request-servicing station, where the third counterpart-plaintext key may be the same as the first counterpart-plaintext key if both of the first and third counterpart-plaintext keys originate in the physically secured facilities of the request-servicing station;

(a.4) a fourth field containing data of a fourth algorithmically-secured key, where said fourth secured key is derived from a fourth counterpart and private key of the request-servicing station and from said third counterpart-plaintext key;

(b) requiring use of the data of said fourth field and use of the data of at least of said first field for reproducing in the physically secured facilities of the request-servicing station, said fourth counterpart and private key of the request servicing station; and (c) requiring use of the data of said second field and use of the data of said first field for reproducing in the physically secured facilities of the request servicing station, said second counterpart and private key of the passport-associated user.

* * * * *

UNITED STATES PATENT AND TRADEMARK OFFICE
CERTIFICATE OF CORRECTION

PATENT NO.    : 6,408,389 B2                                                                Page 1 of 1
DATED         : June 18, 2002
INVENTOR(S)   : David Grawrock et al.

It is certified that error appears in the above-identified patent and that said Letters Patent is hereby corrected as shown below:

Column 1,
Lines 12-13, delete "Feb. 5, 2002".

Column 4,
Line 35, "record can. be" should be -- record can be --.

Column 12,
Line 12, "because *FILE* 109" should be -- because FILE* 109 --.

Column 15,
Line 37, "produced-a properly" should be -- produced a properly --.

Column 25,
Line 8, "record record processing" should be -- record record-processing --.

Signed and Sealed this

Twentieth Day of August, 2002

Attest:

JAMES E. ROGAN
Attesting Officer               Director of the United States Patent and Trademark Office